US009028786B2

(12) United States Patent
Nishida et al.

(10) Patent No.: US 9,028,786 B2
(45) Date of Patent: May 12, 2015

(54) PRODUCTION PROCESS OF DIFLUOROPHOSPHATE, NONAQUEOUS ELECTROLYTIC SOLUTION AND NONAQUEOUS ELECTROLYTIC SECONDARY BATTERY

(75) Inventors: Tetsuo Nishida, Osaka (JP); Megumi Tomisaki, Osaka (JP); Kazuhiko Shogami, Osaka (JP); Hideki Nakashima, Osaka (JP); Hirofumi Suzuki, Mie (JP); Takashi Fujii, Tokyo (JP)

(73) Assignees: Stella Chemifa Corporation, Osaka-shi (JP); Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 13/113,541

(22) Filed: May 23, 2011

(65) Prior Publication Data
US 2011/0223089 A1  Sep. 15, 2011

Related U.S. Application Data

(63) Continuation of application No. 13/002,090, filed as application No. PCT/JP2009/070196 on Dec. 1, 2009.

(30) Foreign Application Priority Data

Dec. 2, 2008 (JP) ................. 2008-307202
Dec. 2, 2008 (JP) ................. 2008-307207
Dec. 2, 2008 (JP) ................. 2008-307208

(51) Int. Cl.
C01B 25/10    (2006.01)
H01M 10/02   (2006.01)
H01M 10/052  (2010.01)
C01B 25/455   (2006.01)
H01M 10/0569 (2010.01)
H01M 10/0567 (2010.01)

(52) U.S. Cl.
CPC .......... *H01M 10/052* (2013.01); *C01B 25/455* (2013.01); *H01M 10/0569* (2013.01); *H01M 2300/0025* (2013.01); *H01M 2300/0091* (2013.01); *Y02E 60/122* (2013.01); *H01M 10/0567* (2013.01)

(58) Field of Classification Search
None
See application file for complete search history.

(56) References Cited

U.S. PATENT DOCUMENTS

2008/0102376 A1   5/2008 Kato et al.
2008/0305402 A1  12/2008 Kato et al.
2009/0286155 A1* 11/2009 Takehara ............... 429/199
2010/0015514 A1   1/2010 Miyagi et al.
2010/0323240 A1* 12/2010 Tsujioka et al. ........ 429/199

FOREIGN PATENT DOCUMENTS

| DE | 8 13 848 | 7/1951 |
|---|---|---|
| EP | 1 905 739 A1 | 4/2008 |
| EP | 2 061 115 A1 | 5/2009 |
| EP | 2 166 611 A1 | 3/2010 |
| JP | 10-316410 | 12/1998 |
| JP | 11 067270 | 3/1999 |
| JP | 2005 053727 | 3/2005 |
| JP | 2005 219994 | 8/2005 |
| JP | 2005-251456 A | 9/2005 |
| JP | 2005 306619 | 11/2005 |
| JP | 2006 143572 | 6/2006 |
| JP | 2007 35617 | 2/2007 |
| JP | 2007 141830 | 6/2007 |
| JP | 2007 165125 | 6/2007 |
| JP | 2007 165294 | 6/2007 |
| JP | 2007 173180 | 7/2007 |
| JP | 2008 140767 | 6/2008 |
| JP | 2008 222484 | 9/2008 |
| JP | 2008-269982 A | 11/2008 |
| JP | 2008-277001 A | 11/2008 |
| WO | WO 2006/043538 A1 | 4/2006 |
| WO | WO 2006/137177 A1 | 12/2006 |
| WO | WO 2008/023744 A1 | 2/2008 |

(Continued)

OTHER PUBLICATIONS

International Search Report issued Jan. 12, 2010 in PCT/JP09/070196 filed Dec. 1, 2009.

(Continued)

*Primary Examiner* — Patrick Ryan
*Assistant Examiner* — Adam A Arciero
(74) *Attorney, Agent, or Firm* — Oblon, McClelland, Maier & Neustadt, L.L.P.

(57) ABSTRACT

To provide a technique for simply and easily producing a high-purity difluorophosphate and provide a production process of an electrolytic solution using the obtained difluorophosphate, an electrolytic solution and a secondary battery.

A process for producing a difluorophosphate, comprising the following step (1) or (2):

(1) reacting (A) at least one member selected from the group consisting of oxoacids, oxoacid anhydrides and oxyhalides of phosphorus with (B) a hexafluorophosphate in the presence of hydrogen fluoride, or (2) reacting at least one halide selected from the group consisting of alkali metal halides, alkaline earth metal halides, aluminum halides and onium halides with difluorophosphoric acid in the presence of a hexafluorophosphate.

Also, a nonaqueous electrolytic solution containing the obtained difluorophosphate, and a nonaqueous electrolytic secondary battery containing the nonaqueous electrolytic solution.

4 Claims, No Drawings

(56) References Cited

FOREIGN PATENT DOCUMENTS

WO   WO 2008111367 A1 *  9/2008
WO   WO 2008/133207 A1   11/2008

OTHER PUBLICATIONS

Riss, I.G., et al., "Sodium Difluorophosphate," Zhurnal Neorganicheskoi Khimii, vol. 7, No. 6, pp. 1313-1315, (1962) (with English language translation).

Vast, P., et al., "Etude Methodologique De La Synthese Des Difluorodioxophosphates Metalliques A Partir De L'Oxyde Du Difluorure De Phosphoryle," Journal of Fluorine Chemistry, vol. 38, pp. 297-302, (1988) (with English Abstract).

Thompson, R.C., et al., "Preparation and Infrared Spectra of Alkali Metal Difluorophosphates," Inorg. Nucl. Chem. Letters, vol. 5, No. 7, pp. 581-585, (1969).

Namamura, T., et al., "Synthesis of Mono- and Difluorophosphoric Acid and Determination of Purity Thereof by Ion Chromatography," Japan Society for Analytical Chemistry, The 43$^{rd}$ Conference Lecture Abstruct, p. 536, (1994) (with English language translation).

Search Report issued Jul. 14, 2011 in European Patent Application No. 11165710.2-1227.

U.S. Appl. No. 13/110,564, filed May 18, 2011, Nishida, et al.

European Office Action issued May 16, 2012, in Patent Application No. 11 165 710.2.

Extended European Search Report issued May 22, 2012, in Patent Application No. 09830403.3.

Korean Office Action issued Jun. 1, 2012 in Patent Application No. 10-2011-7009628 (with English-language translation).

Office Action issued Dec. 3, 2013 in Japanese Patent Application No. 2008-307202 (with English language translation).

* cited by examiner

PRODUCTION PROCESS OF DIFLUOROPHOSPHATE, NONAQUEOUS ELECTROLYTIC SOLUTION AND NONAQUEOUS ELECTROLYTIC SECONDARY BATTERY

CROSS REFERENCE TO RELATED APPLICATION

This Application is a continuation of U.S. application Ser. No. 13/002,090, filed on Dec. 30, 2010, which is a 371 of PCT/JP09/070,196, filed Dec. 1, 2009, and claims priority to the following applications: Japanese Patent Application No. 2008-307202, filed Dec. 2, 2008; Japanese Patent Application No. 2008-307207, filed Dec. 2, 2008; and Japanese Patent Application No. 2008-307208, filed Dec. 2, 2008, the text of which is also incorporated by reference.

TECHNICAL FIELD

The present invention relates to a difluorophosphate, a nonaqueous electrolytic solution containing a difluorophosphate obtained by the production process, and a nonaqueous electrolytic secondary battery using the nonaqueous electrolytic solution.

BACKGROUND ART

In recent years, with expansion of the application field of a lithium secondary battery from electronic devices such as cellular phone, personal computer and digital camera to in-car devices, higher enhancement in the performance of a lithium secondary battery, such as increase of the output density and energy density and reduction of the capacity loss, is proceeding. In particular, the in-car application may involve exposure to a harsh environment as compared with the civilian application and therefore, requires high reliability in terms of cycle life and storage performance.

Conventionally, a nonaqueous electrolytic solution obtained by dissolving a lithium salt in an organic solvent is being used for the electrolytic solution of a lithium secondary battery. The decomposition and side reaction of such a nonaqueous electrolytic solution affect the performance of the lithium secondary battery, and with an attempt to enhance the cycle life and storage performance, a technique of mixing various additives in the nonaqueous electrolytic solution has been used.

A difluorophosphate is known to be advantageous as such an additive. For example, it is disclosed in Patent Document 1 that when a nonaqueous electrolytic solution containing, as the additive, at least either one of lithium monofluorophosphate and lithium difluorophosphate is used, a film can be formed on the positive electrode and the negative electrode of a lithium secondary battery and this enables preventing the electrolytic solution from decomposition due to contact of the nonaqueous electrolytic solution with the positive electrode active material and the negative electrode active and realizing suppression of the self-discharge and enhancement of the storage performance.

With respect to lithium difluorophosphate, its production process is disclosed in Non-Patent Documents 1 to 4 and Patent Documents 2 to 7. Non-Patent Document 1 discloses a method of causing ammonium fluoride, acidic sodium fluoride and the like to act on diphosphorus pentoxide to obtain a difluorophosphate. However, this method suffers from by-production of a monofluorophosphate, a phosphate and water in large amounts other than the difluorophosphate, giving rise to a heavy load in the subsequent purification step, and can be hardly said to be an efficient technique.

Non-Patent Document 2 discloses a method of causing $P_2O_3F_4$ (difluorophosphoric acid anhydride) to act on an oxide or hydroxide such as $Li_2O$ and LiOH to obtain a difluorophosphate. However, this method is disadvantageous to industrial production because the difluorophosphoric acid anhydride used therein is very expensive and moreover, a high-purity product is difficulty available.

Non-Patent Document 3 discloses a method of reacting difluorophosphoric acid and lithium chloride to obtain lithium difluorophosphate. However, in this method, a monofluorophosphate is readily produced as an impurity and high-purity lithium difluorophosphate can be hardly obtained.

Non-Patent Document 4 discloses a technique of melting/reacting urea, potassium dihydrogenphosphate and ammonium fluoride to obtain potassium difluorophosphate. However, this method requires disposal of an ammonia gas by-produced in a large amount and allows remaining of a large amount of ammonium fluoride and can be hardly said to be an efficient technique.

Patent Document 2 describes a method of melting/reacting potassium hexafluorophosphate and potassium metaphosphate to obtain potassium difluorophosphate, but there is a fear of contamination from a crucible used for melting and in view of necessity of as a high temperature environment as 700° C., this method is also not a productive technique.

Patent Documents 3 to 5 disclose a method of reacting lithium hexafluorophosphate with a borate, silicon dioxide or a carbonate in a nonaqueous solvent to obtain lithium difluorophosphate.

Patent Document 6 discloses a method of bringing a carbonate and a borate into contact with a gas such as phosphorus pentafluoride to obtain lithium difluorophosphate. However, in order to obtain a difluorophosphate by such a reaction, a long time of, for example, from 40 to 170 hours is required, which is unsuitable for industrial production.

Patent Document 7 discloses a method of reacting a halide except for fluoride with lithium hexafluorophosphate and water in a nonaqueous solvent to obtain lithium difluorophosphate. However, in this method, the lithium difluorophosphate is obtained only as a mixture with lithium hexafluorophosphate but cannot be obtained as a simple substance. Furthermore, the lithium difluorophosphate is obtained only in a state of being dissolved in a solution, and the operation for compositional adjustment of the electrolytic solution is cumbersome, which is disadvantageous to industrial production.

Patent Document 8 discloses a technique of reacting hexafluorophosphate with a compound having an Si—O—Si bond in an organic electrolytic solution to obtain lithium difluorophosphate, but a step of removing a compound which is newly produced in the system and has a boiling point lower than that of the compound having an Si—O—Si bond, is necessary.

RELATED ART

Patent Document

Patent Document 1: JP-A-11-67270 (the term "JP-A" as used herein means an "unexamined published Japanese patent application")
Patent Document 2: German Unexamined Patent Publication No. 813,848
Patent Document 3: JP-A-2005-53727
Patent Document 4: JP-A-2005-219994

Patent Document 5: JP-A-2005-306619
Patent Document 6: JP-A-2006-143572
Patent Document 7: JP-A-2008-222484
Patent Document 8: JP-A-2008-140767

Non-Patent Document

Non-Patent Document 1: *Zh. Neorgan. Khim.*, vol. 7, pp. 1313-1315 (1962)
Non-Patent Document 2: *Journal of Fluorine Chemistry*, vol. 38, pp. 297-302 (1988)
Non-Patent Document 3: *Inorganic Nuclear Chemistry Letters*, vol. 5, pp. 581-585 (1969)
Non-Patent Document 4: Japan Society for Analytical Chemistry, The 43rd Conference Lecture Abstract, page 536 (1994)

SUMMARY OF THE INVENTION

Problems that the Invention is to Solve

The present invention has been made to solve those problems and an object of the present invention is to provide a technique for simply and easily producing a high-purity difluorophosphate. Another object of the present invention is to provide a nonaqueous electrolytic solution containing a difluorophosphate obtained by the production process and a nonaqueous electrolytic secondary battery using the nonaqueous electrolytic solution.

Means for Solving the Problems

The present inventors have made intensive studies to attain the above-described objects, as a result, it has been found that a high-purity difluorophosphate is obtained by a production process including the following step (1) or (2). The present invention has been accomplished based on this finding.

(1) A step of reacting (A) at least one member selected from the group consisting of oxoacids, oxoacid anhydrides and oxyhalides of phosphorus with (B) a hexafluorophosphate in the presence of hydrogen fluoride.

(2) A step of reacting at least one halide selected from the group consisting of alkali metal halides, alkaline earth metal halides, and aluminum and onium halides with difluorophosphoric acid in the presence of a hexafluorophosphate.

That is, the present invention includes the followings.

1. A process for producing a difluorophosphate, comprising the following step (1) or (2):
(1) reacting (A) at least one member selected from the group consisting of oxoacids, oxoacid anhydrides and oxyhalides of phosphorus with (B) a hexafluorophosphate in the presence of hydrogen fluoride, or
(2) reacting at least one halide selected from the group consisting of alkali metal halides, alkaline earth metal halides, aluminum halides and onium halides with difluorophosphoric acid in the presence of a hexafluorophosphate.

2. The production process of a difluorophosphate as described in 1, comprising the step (1).

3. The production process of a difluorophosphate as described in 1 or 2 above, wherein in the step (1), (C) at least one member selected from the group consisting of halides, carbonates, borates, phosphates, hydroxides and oxides of alkali metal, alkaline earth metal, aluminum or onium is reacted together with (A) and (B) in the presence of hydrogen fluoride.

4. The production process of a difluorophosphate as described in any one of 1 to 3 above, wherein in the step (1), (A) is at least one member selected from the group consisting of phosphoric acid, diphosphorus pentoxide, phosphorus trichloride, diphosphoryl chloride and pyrophosphoric acid.

5. The production process of a difluorophosphate as described in any one of 1 to 4 above, wherein in the step (1), the hydrogen fluoride is in the form of anhydrous hydrofluoric acid or a mixture of anhydrous hydrofluoric acid and an organic solvent.

6. The production process of a difluorophosphate as described in any one of 3 to 5 above, wherein in the step (1), (C) is at lease one member selected from the group consisting of halides, carbonates, borates, phosphates, hydroxides and oxides of alkali metal.

7. The production process of a difluorophosphate as described in 6 above, wherein in the step (1), the alkali metal of (C) is lithium.

8. The production process of a difluorophosphate as described in 7 above, wherein in the step (1), (C) is at least either one of lithium carbonate and lithium fluoride.

9. The production process of a difluorophosphate as described in 1, comprising the step (2).

10. The production process of a difluorophosphate as described in 9 above, wherein in the step (2), the halide is an alkali metal halide.

11. The production process of a difluorophosphate as described in 10 above, wherein in the step (2), the alkali metal halide is at least either one of lithium fluoride and lithium chloride.

12. The production process of a difluorophosphate as described in any one of 1 to 11 above, wherein the hexafluorophosphate is at least one member selected from lithium hexafluorophosphate, sodium hexafluorophosphate, potassium hexafluorophosphate and ammonium hexafluorophosphate.

13. A nonaqueous electrolytic solution comprising an electrolyte, a nonaqueous solvent and the difluorophosphate produced by the process described in any one of 1 to 12 above.

14. The nonaqueous electrolytic solution as described in 13 above, wherein the content of the difluorophosphate is from 0.001 to 5% by mass.

15. A nonaqueous electrolytic secondary battery comprising a positive electrode, a negative electrode capable of occluding and releasing an ion, and the nonaqueous electrolytic solution described in 13 or 14.

The production process of a difluorophosphate of the present invention is characterized in that a hexafluorophosphate is present at the synthesis of a difluorophosphate. Excess water mixed from raw materials and the atmosphere causes hydrolysis of the difluorophosphate in the reaction system and seriously decreases the product purity. On the other hand, in the production process of a difluorophosphate of the present invention, a hexafluorophosphate is considered to act as a scavenger of the excess water and enable achieving the production of a high-purity difluorophosphate. Also, the hexafluorophosphate liberates hydrogen fluoride simultaneously with the production of a difluorophosphate by the reaction with excess water, and the hydrogen fluoride can convert a monofluorophosphate and a phosphate produced as by-products in the reaction system into a difluorophosphate, which is considered to yield the production of a higher-purity difluorophosphate.

Advantage of the Invention

According to the production process of a difluorophosphate of the present invention, a high-purity difluorophosphate can be easily and simply produced, and this is advantageous in industry.

In particular, a difluorophosphate is very useful as an additive of a nonaqueous electrolytic solution, and a nonaqueous electrolytic solution with excellent performance can be provided by using the high-purity difluorophosphate obtained by the production process of the present invention.

Furthermore, the nonaqueous electrolytic solution of the present invention contains the high-purity difluorophosphate and therefore, can sufficiently bring out the effect of the difluorophosphate, and the nonaqueous electrolytic secondary battery using the nonaqueous electrolytic solution can be improved in the cycle characteristics and low-temperature discharge characteristics.

MODE FOR CARRYING OUT THE INVENTION

The mode for carrying out the present invention is described in detail below, but the present invention is not limited to these contents.

[I. Production Process of Difluorophosphate]

In the present invention, a difluorophosphate is produced by either one of the following production processes.

(First Production Process)

The first production process is a production process including a step (1) of reacting (A) at least one member selected from the group consisting of oxoacids, oxoacid anhydrides and oxyhalides of phosphorus with (B) a hexafluorophosphate in the presence of hydrogen fluoride.

In the step (1), (C) at least one member selected from the group consisting of halides, carbonates, borates, phosphates, hydroxides and oxides of alkali metal, alkaline earth metal, aluminum or onium may be reacted together with (A) and (B) in the presence of hydrogen fluoride.

(Second Production Process)

The second production process is a production process including a step (2) of reacting at least one halide selected from the group consisting of alkali metal halides, alkaline earth metal halides, aluminum halides and onium halides with difluorophosphoric acid in the presence of a hexafluorophosphate.

I-1. First Production Process

The first production process of the present invention is described. In the first production process, (A) at least one member selected from the group consisting of oxoacids, oxoacid anhydrides and oxyhalides of phosphorus is used.

Examples of the oxoacids of phosphorus include phosphoric acid; metaphosphoric acid; a chain polyphosphoric acid such as pyrophosphoric acid and tripolyphosphoric acid which are formed by the dehydration condensation of phosphoric acid; a cyclic polyphosphoric acid such as trimetaphosphoric acid; phosphonic acid; and phosphinic acid. An anhydride of these oxoacids of phosphorus can also be used, and examples thereof include diphosphorus pentoxide.

Examples of the oxyhalides of phosphorus include phosphorus trichloride, phosphorus trifluoride and phosphorus dichloride fluoride.

In view of easy handleability, cost advantage and easy availability, phosphoric acid and diphosphorus pentoxide are preferred as (A). Also, phosphorus trichloride, diphosphoryl chloride and pyrophosphoric acid are preferred, and among these compounds, phosphorus trichloride and pyrophosphoric acid are more preferred.

In the first production process, (B) a hexafluorophosphate is used. Examples of the hexafluorophosphate include lithium hexafluorophosphate, potassium hexafluorophosphate, sodium hexafluorophosphate and ammonium hexafluorophosphate. Among these, in view of reactivity with excess water, lithium hexafluorophosphate is preferred.

Examples of the ammonium include an ammonium ion, a secondary ammonium, a tertiary ammonium and a quaternary ammonium. Examples of the quaternary ammonium include, but are not limited to, a tetraalkylammonium (e.g., tetramethylammonium, tetraethylammonium, triethylmethylammonium), an imidazolium (e.g., 1-butyl-3-methylimidazolium), pyrazolium, pyridinium, triazolium, pyridazinium, thiazolium, oxazolium, pyrimidinium and pyrazinium.

In the first production process, (C) at least one member selected from the group consisting of halides, carbonates, borates, phosphates, hydroxides and oxides of alkali metal, alkaline earth metal, aluminum or onium may be used together with (A) and (B).

Examples of the alkali metal include lithium (Li), sodium (Na), potassium (K), rubidium (Rb) and cesium (Cs). In view of easy availability, lithium (Li), sodium (Na) and potassium (K) are preferred.

Examples of the alkaline earth metal include beryllium (Be), magnesium (Mg), calcium (Ca), strontium (Sr) and barium (Ba). In view of easy availability and safety, magnesium (Mg), calcium (Ca) and barium (Ba) are preferred. From the same reasons, aluminum (Al) is also preferred.

Examples of the onium include an ammonium, a phosphonium and a sulfonium.

Examples of the ammonium include an ammonium ion, a secondary ammonium, a tertiary ammonium and a quaternary ammonium. Examples of the quaternary ammonium include, but are not limited to, a tetraalkylammonium (e.g., tetramethylammonium, tetraethylammonium, triethylmethylammonium), imidazolium, pyrazolium, pyridinium, triazolium, pyridazinium, thiazolium, oxazolium, pyrimidinium and pyrazinium.

Examples of the phosphonium include a tetraalkylphosphonium (e.g., tetramethylphosphonium, tetramethylphosphonium).

Examples of the sulfonium include a trialkylsulfonium (e.g., trimethylsulfonium, triethylsulfonium).

Examples of the halide include a fluoride, a chloride, a bromide and an iodide. In view of molecular weight, a fluoride and a chloride are preferred.

Examples of the borate include an orthoborate, a metaborate, a diborate, a tetraborate, a pentaborate and an octaborate. In view of cost and easy availability, an orthoborate, a metaborate and a tetraborate are preferred.

Examples of the phosphate include orthophosphate, monohydrogen phosphate, dihydrogen phosphate, monohydrogen metaphosphate, dihydrogen metaphosphate, phosphenate and metaphosphenate. In view of cost and easy availability, orthophosphate and dihydrogen phosphate are preferred.

(C) is preferably a halide, a carbonate, a borate, a phosphate, a hydroxide or an oxide of alkali metal, more preferably a halide, a carbonate, a borate, a phosphate, a hydroxide or an oxide of lithium metal, still more preferably lithium fluoride, lithium carbonate or lithium borate. In addition, lithium hydroxide monohydrate and lithium dihydrogenphosphate are also preferred.

In the first production process, (A), (B) and depending on the case, (C) are reacted in the presence of hydrogen fluoride. The hydrogen fluoride is not limited in its supply form but may be in the form of, for example, anhydrous hydrofluoric acid or a mixture of anhydrous hydrofluoric acid and an organic solvent.

In the case of a mixture of anhydrous hydrofluoric acid and an organic solvent, the organic solvent is not particularly limited as long as it is an organic solvent undergoing no reaction with anhydrous hydrogen fluoride and being inert to the reaction. Examples of the organic solvent include a cyclic carbonic acid ester, a chain carbonic acid ester, a phosphoric acid ester, a cyclic ether, a chain ether, a lactone compound, a chain ester, a nitrile compound, an amide compound, a sulfone compound, alcohols and hydrocarbons. Examples thereof include, but are not limited to, the following compounds.

Examples of the cyclic carbonic acid ester include ethylene carbonate, propylene carbonate and butylene carbonate, with ethylene carbonate and propylene carbonate being preferred.

Examples of the chain carbonic acid ester include dimethyl carbonate, ethyl methyl carbonate and diethyl carbonate, with dimethyl carbonate and ethyl methyl carbonate being preferred.

Examples of the phosphoric acid ester include trimethyl phosphate, triethyl phosphate, dimethylethyl phosphate and methyldiethyl phosphate.

Examples of the cyclic ether include tetrahydrofuran and 2-methyltetrahydrofuran.

Examples of the chain ether include dimethoxyethane.

Examples of the lactone compound include γ-butyrolactone.

Examples of the chain ester include methyl propionate, methyl acetate, ethyl acetate and methyl formate.

Examples of the nitrile compound include acetonitrile.

Examples of the amide compound include dimethylformamide.

Examples of the sulfone compound include sulfolane and methylsulfolane.

Examples of the alcohols include methyl alcohol, ethyl alcohol, n-propyl alcohol, isopropyl alcohol, butyl alcohol and octyl alcohol.

Examples of the hydrocarbons include n-pentane, n-hexane, n-octane and cyclohexane.

One of these organic solvents may be used alone, or two or more thereof may be mixed and used. Also, an organic solvent obtained by at least partially replacing the hydrogen of the hydrocarbon group contained in the molecule of the organic solvent above with fluorine may be suitably used.

Furthermore, a mixture of ethyl acetate and hexane, and a chain carbonic acid ester can also be suitably used as the organic solvent. In view of utilizability as an additive of a nonaqueous electrolytic solution and easiness of removal of the attached solvent, a chain carbonic acid ester is preferred, and dimethyl carbonate and ethyl methyl carbonate are more preferred.

In the first production process, (A) at least one member selected from the group consisting of oxoacids, oxoacid anhydrides and oxyhalides of phosphorus and (B) a hexafluorophosphate are preferably reacted in the following molar ratio in the presence of hydrogen fluoride. Assuming that the molar number of phosphorus atom contained in (A) is (a), the molar number of anion ($PF_6^-$) contained in (B) is (b) and the molar number of hydrogen fluoride is (d), preferably, per mol of (b), (a) is from 1 to 4 mol and (d) is from 0.01 to 100 mol; more preferably, (a) is from 1.4 to 4 mol and (d) is from 0.1 to 90 mol; and still more preferably, (a) is from 1.6 to 4 mol and (d) is from 1 to 80 mol.

In another embodiment of the first production process of the present invention, (A) at least one member selected from the group consisting of oxoacids, oxoacid anhydrides and oxyhalides of phosphorus, (B) a hexafluorophosphate and (C) at least one member selected from the group consisting of halides, carbonates, borates, phosphates, hydroxides and oxides of alkali metal, alkaline earth metal, aluminum or onium can be reacted in the presence of hydrogen fluoride. In this case, preferably, per mol of (b), (a) is from 1 to 4 mol, n×(c) is more than 0 to 5 mol, and (d) is from 0.01 to 100 mol; more preferably, (a) is from 1.4 to 4 mol, n×(c) is from 0.1 to 5 mol, and (d) is from 0.1 to 90 mol; and still more preferably, (a) is from 1.6 to 4 mol, n×(c) is from 0.2 to 5 mol, and (d) is from 1 to 80 mol, wherein (c) represents a mole number of cation contained in the (C), and n represents a cation valence (for example in a monvalent cation such as lithium, n represents 1).

In any embodiment, although details of the reaction mechanism are not elucidated, it is considered that the production of difluorophosphoric acid by the reaction of (A) with hydrogen fluoride, and the reaction of the produced difluorophosphoric acid with (B) and depending on the case, (C), are participating in the production of a difluorophosphate.

In the first production process, (A), (B) and depending on the case, (C) are reacted in the presence of hydrogen fluoride. At this time, the order of adding (A), (B), (C) that is added depending on the case, and hydrogen fluoride is not particularly limited, and all may be mixed at the same time. It is preferred to mix (A), (B) and depending on the case, (C) and then add hydrogen fluoride. At the reaction, urea, carbon monoxide, carbonyl fluoride and the like may be allowed to be present.

By using, as (C), an alkali metal salt, an alkaline earth metal salt, an aluminum salt or an onium salt, a corresponding difluorophosphate of alkali metal, alkaline earth metal, aluminum or onium can be obtained.

In the case where counter cations of the salts of (B) and (C) are different, a double difluorophosphate can be obtained.

The reaction may be performed without a solvent or may be performed in an appropriate solvent. In the case of using a solvent, the solvent is not particularly limited as long as it is an organic solvent inert to the reaction. Examples of such a solvent include a cyclic carbonic acid ester, a chain carbonic acid ester, a phosphoric acid ester, a cyclic ether, a chain ether, a lactone compound, a chain ester, a nitrile compound, an amide compound, a sulfone compound and alcohols. Examples thereof include, but are not limited to, the following compounds.

Examples of the cyclic carbonic acid ester include ethylene carbonate, propylene carbonate and butylene carbonate, with ethylene carbonate and propylene carbonate being preferred.

Examples of the chain carbonic acid ester include dimethyl carbonate, ethyl methyl carbonate and diethyl carbonate, with dimethyl carbonate and ethyl methyl carbonate being preferred.

Examples of the phosphoric acid ester include trimethyl phosphate, triethyl phosphate, dimethylethyl phosphate and methyldiethyl phosphate.

Examples of the cyclic ether include tetrahydrofuran and 2-methyltetrahydrofuran.

Examples of the chain ether include dimethoxyethane.

Examples of the lactone compound include γ-butyrolactone.

Examples of the chain ester include methyl propionate, methyl acetate, ethyl acetate and methyl formate.

Examples of the nitrile compound include acetonitrile.

Examples of the amide compound include dimethylformamide.

Examples of the sulfone compound include sulfolane and methylsulfolane.

Examples of the alcohols include methyl alcohol, ethyl alcohol, n-propyl alcohol, isopropyl alcohol, butyl alcohol and octyl alcohol.

One of these organic solvents may be used alone, or two or more thereof may be mixed and used. Also, an organic solvent obtained by at least partially replacing the hydrogen of the hydrocarbon group contained in the molecule of the organic solvent above with fluorine may be suitably used.

In the first production process, the reaction conditions can be arbitrarily set. The reaction temperature is preferably from 0 to 300° C., more preferably from 0 to 200° C., still more preferably from 0 to 180° C. The reaction may be performed under atmospheric pressure or under reduced pressure. The reaction time is usually from 0.5 to 5 hours but can be appropriately changed according to the reaction apparatus, charge amount and the like and is not limited to the range above.

In order to raise the reaction efficiency, refluxing is preferably performed. The temperature of the reflux tower is preferably from −50° C. to 10° C., more preferably from −40° C. to 8° C., still more preferably from −30° C. to 5° C. After the reaction, when insoluble components are produced in the reaction solution, these can be filtered out by a normal filtering operation. As for the filter used at the filtration, a polyolefin-made filter or a fluororesin-made filter is preferably used, because the reaction solution has high acidity and contains hydrofluoric acid. In view of corrosion resistance, a fluororesin-made filter is more preferred. The reaction solvent and reaction by-products present in excess after the reaction can be removed by a general heating operation and a general depressurizing operation. The heating/drying temperature here is preferably from 100 to 200° C., more preferably from 110 to 180° C., still more preferably from 120 to 150° C.

I-2. Second Production Process

The second production process of the present invention is described. In the second production process of a difluorophosphate, at least one halide selected from the group consisting of alkali metal halides, alkaline earth metal halides, aluminum halides and onium halides is used. One kind of a halide may be used alone, or two or more kinds of halides may be used in combination. In the case of using two or more kinds of halides in combination, the counter cations of the halides may be the same or different. When the counter cations are different, a double difluorophosphate is formed.

Examples of the alkali metal halide, alkaline earth metal halide, aluminum halide and onium halide include the elements, groups and the like described in the first production process, and preferred examples are also the same as those in the first production process.

The halide includes a fluoride, a chloride, a bromide and an iodide. In view of molecular weight, a fluoride and a chloride are preferred.

In particular, the halide is preferably an alkali metal halide, more preferably a lithium halide, still more preferably lithium chloride or lithium fluoride. A sodium halide or a potassium halide can also be used as the alkali metal halide, and examples thereof include sodium chloride and potassium chloride.

In the second production process, a halide and difluorophosphoric acid are reacted in the presence of a hexafluorophosphate. By using an alkali metal halide, an alkaline earth metal halide, an aluminum halide or an onium halide as the halide, a corresponding difluorophosphate of alkali metal, alkaline earth metal, aluminum or onium can be obtained.

Examples and preferred examples of the hexafluorophosphate are the same as in the first production process.

In the second production process, the charge amounts of the halide and the difluorophosphoric acid can be arbitrarily set. In general, the halide remaining after the reaction can be removed by a purification operation and therefore, the halide can be used in an excess amount. On the other hand, an excess amount of difluorophosphoric acid causes production of a by-product such as monofluorophosphate, but the remaining difluorophosphoric acid can be removed by a general purification operation such as washing.

The difluorophosphoric acid is preferably used in an amount of 1.1 equivalents or less per equivalent of the halide and from the standpoint of reducing the load of the purification operation, the difluorophosphoric acid is more preferably used in an amount of 0.95 to 1.05 equivalents, still more preferably from 0.98 to 1.02 equivalents, yet still more preferably from 0.99 to 1.01 equivalents, per equivalent of the halide.

In the second production process, the charge amount of the hexafluorophosphate can be arbitrarily set. In view of high purity, the hexafluorophosphate is preferably used in an amount of 0.05 mol or more per mol of the difluorophosphoric acid. In the case of using the obtained difluorophosphate in the application allowing mixing of a hexafluorophosphate, such as nonaqueous electrolytic solution, the upper limit of the charge amount is not particularly limited, but in the case of using the obtained difluorophosphate as a simple substance, the hexafluorophosphate is preferably used in an amount of 0.05 to 0.5 mol, more preferably from 0.1 to 0.4 mol, still more preferably from 0.12 to 0.25 mol, per mol of the difluorophosphoric acid.

The order of adding the halide, the hexafluorophosphate and the difluorophosphoric acid is not particularly limited, and these three may be mixed at the same time. Alternatively, the difluorophosphoric acid may be added after mixing the hexafluorophosphate with the halide, the halide may be added after mixing the hexafluorophosphate with the difluorophosphoric acid, or the hexafluorophosphate may be added after mixing the halide with the difluorophosphoric acid.

The reaction may be performed without a solvent or may be performed in an appropriate solvent. In the case of using a solvent, the solvent is not particularly limited as long as it is an organic solvent inert to the reaction. Examples of the usable compound and known compounds are the same as those described in the first production process.

In the second production process, the reaction conditions can be arbitrarily set. The reaction temperature may be from room temperature (25° C.) to 200° C., but the reaction is preferably performed under heating, and the reaction temperature is, for example, from 100 to 180° C., preferably from 120 to 150° C. The reaction may be performed under atmospheric pressure or under reduced pressure. The reaction time is usually from 1 to 24 hours but can be appropriately changed according to the reaction apparatus, charge amount and the like and is not limited to the range above.

In the second production process, the reaction can also be performed by allowing urea, carbon monoxide, carbonyl fluoride and the like to be present, in addition to the hexafluorophosphate.

I-3. Common Matters in First and Second Production Processes

In the first and second production processes of the present invention, the obtained difluorophosphate may be further subjected to a purification step. The purification method is not particularly limited and, for example, a known technique such as washing and recrystallization can be used.

The solvent used in performing washing and recrystallization is not particularly limited in its kind as long as the solvent does not react with the difluorophosphate or the like or cause decomposition or deterioration. Examples of such a solvent include a cyclic carbonic acid ester, a chain carbonic acid ester, a phosphoric acid ester, a cyclic ether, a chain ether, a lactone compound, a chain ester, a nitrile compound, an amide compound, a sulfone compound, alcohols and hydrocarbons. Examples thereof include, but are not limited to, the following compounds.

Examples of the cyclic carbonic acid ester include ethylene carbonate, propylene carbonate and butylene carbonate, with ethylene carbonate and propylene carbonate being preferred.

Examples of the chain carbonic acid ester include dimethyl carbonate, ethyl methyl carbonate and diethyl carbonate, with dimethyl carbonate and ethyl methyl carbonate being preferred.

Examples of the phosphoric acid ester include trimethyl phosphate, triethyl phosphate, dimethylethyl phosphate and methyldiethyl phosphate.

Examples of the cyclic ether include tetrahydrofuran and 2-methyltetrahydrofuran.

Examples of the chain ether include dimethoxyethane.

Examples of the lactone compound include γ-butyrolactone.

Examples of the chain ester include methyl propionate, methyl acetate, ethyl acetate and methyl formate.

Examples of the nitrile compound include acetonitrile.

Examples of the amide compound include dimethylformamide.

Examples of the sulfone compound include sulfolane and methylsulfolane.

Examples of the alcohols include methyl alcohol, ethyl alcohol, n-propyl alcohol, isopropyl alcohol, butyl alcohol and octyl alcohol.

Examples of the hydrocarbons include n-pentane, n-hexane, n-octane and cyclohexane.

One of these organic solvents may be used alone, or two or more thereof may be mixed and used. Also, an organic solvent obtained by at least partially replacing the hydrogen of the hydrocarbon group contained in the molecule of the organic solvent above with fluorine may be suitably used.

Furthermore, a mixture of ethyl acetate and hexane, and a chain carbonic acid ester can also be suitably used as the organic solvent. In view of utilizability as an additive of a nonaqueous electrolytic solution and easiness of removal of the attached solvent, a chain carbonic acid ester is preferred, and dimethyl carbonate and ethyl methyl carbonate are more preferred.

The difluorophosphate obtained by the production process of the present invention has high purity and can be used as an additive of a nonaqueous electrolytic solution. The purity can be evaluated by performing anion analysis by means of ion chromatography and calculating the relative area ratio of the difluorophosphate ion. The relative area ratio of the difluorophosphate obtained by the first and second production processes of the present invention is preferably 80% or more, more preferably 90% or more.

[II. Nonaqueous Electrolytic Solution]

A nonaqueous electrolytic solution is prepared by blending the difluorophosphate obtained as above, an electrolytic solution and a nonaqueous solvent.

1. Difluorophosphate

One kind of a difluorophosphate may be used alone, or two or more kinds of difluorophosphates may be used in any combination in an arbitrary ratio. The molecular weight of the difluorophosphate is not limited and may be any as long as the effects of the present invention are not seriously impaired, but the molecular weight is usually 100 or more. The upper limit is also not particularly limited but in view of reactivity in the reaction, it is practically preferred that the molecular weight is usually 1,000 or less, preferably 500 or less.

The ratio of the difluorophosphate in the nonaqueous electrolytic solution is, in terms of the total of difluorophosphates, preferably 10 ppm or more (0.001 mass % or more), more preferably 0.01 mass % or more, still more preferably 0.05 mass % or more, yet still more preferably 0.1 mass % or more, based on the entire nonaqueous electrolytic solution. Also, the upper limit is, in terms of the total of difluorophosphates, preferably 5 mass % or less, more preferably 4 mass % or less, still more preferably 3 mass % or less. When the ratio of the difluorophosphate is 10 ppm or more, a sufficiently high effect of improving the cycle characteristics and low-temperature discharge characteristics can be obtained, and when it is 5 mass % or less, an adverse effect on the battery characteristics of charge/discharge efficiency is liable to be avoided.

2. Electrolyte

The electrolyte is not particularly limited, and an arbitrary electrolyte can be employed according to the objective nonaqueous electrolytic secondary battery. In the case of using the nonaqueous electrolytic solution of the present invention in a lithium secondary batteries, the electrolyte is preferably a lithium salt.

Examples of the electrolyte include inorganic lithium salts such as $LiClO_4$, $LiAsF_6$, $LiPF_6$, $Li_2CO_3$ and $LiBF_4$; fluorine-containing organic lithium salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_3(CF_3)$, $LiBF_3(C_2F_5)$, $LiBF_2(CF_3)_2$, $LiBF_2(C_2F_5)_2$, $LiBF_2(CF_3SO_2)_2$ and $LiBF_2(C_2F_5SO_2)_2$; disulfonylimides such as lithium cyclic 1,2-ethanedisulfonylimide, lithium cyclic 1,3-propanedisulfonylimide, lithium cyclic 1,2-perfluoroethanedisulfonylimide, lithium cyclic 1,3-perfluoropropanedisulfonylimide and lithium cyclic 1,4-perfluorobutanedisulfonylimide; dicarboxylic acid complex-containing lithium salts such as lithium bis(oxalato)borate, lithium difluorooxalatoborate, lithium tetrafluoro(oxalato)phosphate, lithium difluorobis(oxalato)phosphate and lithium tris(oxalato)phosphate; and sodium salts or potassium salts such as $KPF_6$, $NaPF_6$, $NaBF_4$ and $CF_3SO_3Na$.

Among these, $LiPF_6$, $LiBF_4$, $LiCF_3SO_3$, $LiN(CF_3SO_2)_2$, $LiN(C_2F_5SO_2)_2$, lithium cyclic 1,2-perfluoroethanedisulfonylimide and lithium bis(oxalato)borate are preferred, and $LiPF_6$ and $LiBF_4$ are more preferred.

One kind of an electrolyte may be used alone, or two or more kinds of electrolytes may be used in any combination in an arbitrary ratio. In particular, a combination use of two kinds of inorganic lithium salts, and a combination use of an inorganic lithium salt and a fluorine-containing organic lithium salt are preferred, because gas evolution during continuous charge or deterioration after high-temperature storage can be effectively suppressed.

Above all, a combination use of $LiPF_6$ and $LiBF_4$, and a combination use of an inorganic lithium salt such as $LiPF_6$ and $LiBF_4$ and a fluorine-containing organic lithium salt such as $LiCF_3SO_3$, $LiN(CF_3SO_2)_2$ and $LiN(C_2F_5SO_2)_2$ are preferred.

In the case of using $LiPF_6$ and $LiBF_4$ in combination, the proportion of $LiBF_4$ occupying in the entire electrolyte is preferably from 0.01 to 20 mass %. Within this range, thanks to low dissociation degree of $LiBF_4$, the nonaqueous electrolytic solution can be prevented from increase in the resistance.

On the other hand, in the case of using an inorganic lithium salt such as $LiPF_6$ and $LiBF_4$ and a fluorine-containing organic lithium salt such as $LiCF_3SO_3$, $LiN(CF_3SO_2)_2$ and $LiN(C_2F_5SO_2)_2$ in combination, the proportion of the inorganic lithium salt occupying in the entire electrolyte is preferably 70 mass % or more and more preferably 99 mass % or less. Within this range, the proportion of the fluorine-containing organic lithium salt whose molecular weight is generally larger than that of the inorganic lithium salt can be prevented from becoming excessively high to decrease the proportion of the nonaqueous solvent occupying in the entire nonaqueous electrolytic solution and increase the resistance of the nonaqueous electrolytic solution.

The final composition of the nonaqueous electrolytic solution may have an arbitrary lithium salt concentration as long as the effects of the present invention are not seriously impaired, but the lithium salt concentration is preferably 0.5 mol/L or more, more preferably 0.6 mol/L or more, still more preferably 0.8 mol/L or more, and is preferably 3 mol/L or less, more preferably 2 mol/L or less, still more preferably 1.5 mol/L or less. When the concentration is not less than the lower limit, a nonaqueous electrolytic solution having sufficient electric conductivity is easily obtained, and when the concentration is not more than the upper limit, an excessive rise of the viscosity can be avoided, and good electric conductivity as well as performance of a nonaqueous electrolytic secondary battery using the nonaqueous electrolytic solution of the present invention are likely to be ensured.

Particularly, in the case where the nonaqueous solvent of the nonaqueous electrolytic solution is mainly composed of a carbonate compound such as alkylene carbonate and dialkyl carbonate, $LiPF_6$ may be used alone but is preferably used in combination with $LiBF_4$, because capacity deterioration due to continuous charge can be suppressed.

In the case of using $LiPF_6$ and $LiBF_4$ in combination, the ratio of $LiBF_4$ is preferably 0.005 mol or more, more preferably 0.01 mol or more, still more preferably 0.05 mol or more, per mol of $LiPF_6$. Also, the ratio of $LiBF_4$ is preferably 0.4 mol or less, more preferably 0.2 mol or less, per mol of $LiPF_6$. When the ratio is not more than the upper limit, the battery characteristics tends to be prevented from deterioration after high-temperature storage and when the ratio is not less than the lower limit, gas evolution during continuous charge or capacity deterioration are liable to be avoided.

Also, in the case where the nonaqueous solvent of the nonaqueous electrolytic solution contains 50 vol % or more of a cyclic carboxylic acid ester compound such as γ-butyrolactone and γ-valerolactone, it is preferred that $LiBF_4$ occupies 50 mol % or more of the entire electrolyte.

3. Nonaqueous Solvent

The nonaqueous solvent is not particularly limited as long as it is a solvent having no adverse effect on the battery characteristics of a battery fabricated, but the nonaqueous solvent is preferably one or more of the following nonaqueous solvents.

Examples of the nonaqueous solvent include chain and cyclic carbonates, chain and cyclic carboxylic acid esters, chain and cyclic ethers, phosphorus-containing organic solvents, and sulfur-containing organic solvents.

The chain carbonate is not particularly limited in its kind, and examples thereof include dialkyl carbonates. The carbon number of each constituent alkyl group is preferably from 1 to 5, more preferably from 1 to 4.

Specific examples thereof include dimethyl carbonate, ethyl methyl carbonate, diethyl carbonate, methyl-n-propyl carbonate, ethyl-n-propyl carbonate and di-n-propyl carbonate.

Among these, dimethyl carbonate, ethyl methyl carbonate and diethyl carbonate are preferred because of their industrial availability and various good characteristics in a nonaqueous electrolytic secondary battery.

The cyclic carbonate is not particularly limited in its kind, and examples thereof include alkylene carbonate. The carbon number of the constituent alkylene group is preferably from 2 to 6, more preferably from 2 to 4.

Specific examples thereof include ethylene carbonate, propylene carbonate and butylene carbonate (e.g., 2-ethylethylene carbonate, cis,trans-2,3-dimethylethylene carbonate).

Among these, ethylene carbonate and propylene carbonate are preferred because of their various good characteristics in a nonaqueous electrolytic secondary battery.

The chain carboxylic acid ester is not particularly limited in its kind, and examples thereof include an acetic acid ester such as methyl acetate, ethyl acetate, n-propyl acetate, isopropyl acetate, n-butyl acetate, isobutyl acetate and tert-butyl acetate; a propionic acid ester such as methyl propionate, ethyl propionate, n-propyl propionate, isopropyl propionate, n-butyl propionate, isobutyl propionate and tert-butyl propionate; and a butyric acid ester such as methyl butyrate and ethyl butyrate.

Among these, methyl acetate, ethyl acetate, methyl propionate, ethyl propionate, methyl butyrate and ethyl butyrate are preferred because of their industrial availability and various good characteristics in a nonaqueous electrolytic secondary battery.

The cyclic carboxylic acid ester is not particularly limited in its kind, and examples thereof include γ-butyrolactone, γ-valerolactone and δ-valerolactone.

Among these, γ-butyrolactone is preferred because of its industrial availability and various good characteristics in a nonaqueous electrolytic secondary battery.

The chain ether is not particularly limited in its kind, and examples thereof include dimethoxymethane, dimethoxyethane, diethoxymethane, diethoxyethane, ethoxymethoxymethane and ethoxymethoxyethane.

Among these, dimethoxyethane and diethoxyethane are preferred because of their industrial availability and various good characteristics in a nonaqueous electrolytic secondary battery.

The cyclic ether is not particularly limited in its kind, and examples thereof include tetrahydrofuran, 2-methyltetrahydrofuran and tetrahydropyran.

The phosphorus-containing organic solvent is not particularly limited in its kind, and examples thereof include phosphoric acid esters such as trimethyl phosphate, triethyl phosphate and triphenyl phosphate; phosphorous acid esters such as trimethyl phosphite, triethyl phosphite and triphenyl phosphite; and phosphine oxides such as trimethylphosphine oxide, triethylphosphine oxide and triphenylphosphine oxide.

The sulfur-containing organic solvent is not particularly limited in its kind, and examples thereof include cyclic sulfites such as ethylene sulfite; cyclic sulfonic acid esters such as 1,3-propanesultone and 1,4-butanesultone; chain sulfonic acid esters such as methyl methanesulfonate and busulfan; cyclic sulfones such as sulfolane and sulfolane; chain sulfones such as dimethyl sulfone, diphenyl sulfone and methyl phenyl sulfone; sulfides such as dibutyl disulfide, dicyclohexyl disulfide and tetramethylthiuram monosulfide; and sulfonamides such as N,N-dimethylmethanesulfonamide and N,N-diethylmethanesulfonamide.

Among these, chain and cyclic carbonates and chain and cyclic carboxylic acid esters are preferred because of their various good characteristics in a nonaqueous electrolytic secondary battery. Of these, ethylene carbonate, propylene carbonate, dimethyl carbonate, ethyl methyl carbonate, diethyl carbonate, methyl acetate, ethyl acetate, methyl propionate, ethyl propionate, methyl butyrate, ethyl butyrate and γ-butyrolactone are more preferred, and ethylene carbonate, propylene carbonate, dimethyl carbonate, ethyl methyl carbonate, diethyl carbonate, methyl acetate, ethyl acetate, methyl propionate, ethyl butyrate and γ-butyrolactone are still more preferred.

One of these nonaqueous solvents may be used alone, or two or more kinds thereof may be used in combination, but a combination use of two or more kinds of nonaqueous solvents is preferred. For example, it is preferred to use a high-permittivity solvent such as cyclic carbonates and a low-viscosity solvent such as chain carbonates and chain esters in combination.

One preferred combination of nonaqueous solvents is a combination mainly composed of cyclic carbonates and chain carbonates. Above all, a combination where the total of cyclic carbonates and chain carbonates occupying in the entire nonaqueous solvent is preferably 80 vol % or more, more preferably 85 vol % or more, still more preferably 90 vol % and the volume of cyclic carbonates based on the total of cyclic carbonates and chain carbonates is preferably 5 vol % or more, more preferably 10 vol % or more, still more preferably 15 vol % or more and is preferably 50 vol % or less, more preferably 35 vol % or less, still more preferably 30 vol % or less, is preferred. A battery fabricated using such a combination of nonaqueous solvents is advantageously improved in the balance between cycle characteristics and high-temperature storage characteristics (in particular, the residual capacity and high-load discharge capacity after high-temperature storage).

Examples of the preferred combination of cyclic carbonates and chain carbonates include a combination of ethylene carbonate with chain carbonates, such as ethylene carbonate and dimethyl carbonate; ethylene carbonate and diethyl carbonate; ethylene carbonate and ethyl methyl carbonate; ethylene carbonate, dimethyl carbonate and diethyl carbonate; ethylene carbonate, dimethyl carbonate and ethyl methyl carbonate; ethylene carbonate, diethyl carbonate and ethyl methyl carbonate; and ethylene carbonate, dimethyl carbonate, diethyl carbonate and ethyl methyl carbonate.

A combination containing asymmetric chain carbonates is more preferred, a combination where the asymmetric chain carbonates is dialkyl carbonate is more preferred, and a combination where the carbon number of the alkyl group constituting the dialkyl carbonate is from 1 to 2 is still more preferred. Preferred examples of the asymmetric chain carbonates where the carbon number of the alkyl group constituting the dialkyl carbonate is from 1 to 2 include ethyl methyl carbonate.

Examples of such a combination of cyclic carbonates and chain carbonates include: ethylene carbonate, dimethyl carbonate and ethyl methyl carbonate; ethylene carbonate, diethyl carbonate and ethyl methyl carbonate; and ethylene carbonate, dimethyl carbonate, diethyl carbonate and ethyl methyl carbonate.

A combination where propylene carbonate is further added to the combination of ethylene carbonate with chain carbonates, is also preferred because of good balance between cycle characteristics and discharge load characteristics. In the case of containing propylene carbonate, the volume ratio between ethylene carbonate and propylene carbonate is preferably from 99:1 to 40:60, more preferably from 95:5 to 50:50.

Furthermore, the proportion of propylene carbonate occupying in the entire nonaqueous solvent is preferably from 0.1 to 10 vol % and in this case, more excellent discharge load characteristics are advantageously obtained while maintaining the characteristics of the combination of ethylene carbonate with chain carbonates. The amount of propylene carbonate is more preferably 1 vol % or more, still more preferably 2 vol % or more, and is more preferably 8 vol % or less, still more preferably 5 vol % or less.

Other preferred examples of the nonaqueous solvent include those containing a chain ester. In particular, a nonaqueous solvent containing a chain ester in the above-described mixed solvent of cyclic carbonates and chain carbonates is preferred from the standpoint of enhancing the discharge load characteristics of a battery.

Preferred examples of the chain ester include methyl acetate, ethyl acetate, methyl propionate, methyl butyrate and ethyl butyrate. The volume of the chain ester occupying in the nonaqueous solvent is preferably 5 vol % or more, more preferably 8 vol % or more, still more preferably 10 vol % or more and is preferably 50 vol % or less, more preferably 35 vol % or less, still more preferably 30 vol % or less, yet still more preferably 25 vol % or less.

Other preferred examples of the nonaqueous solvent include those where one kind of or two or more kinds of organic solvents selected from the group consisting of ethylene carbonate, propylene carbonate, butylene carbonate, γ-butyrolactone and γ-valerolactone account for 60 vol % or more of the entire nonaqueous solvent. The nonaqueous solvent preferably has a flash point of 50° C. or more, more preferably 70° C. or more. Thanks to use of such a nonaqueous electrolytic solution, evaporation of the solvent or liquid leakage is reduced even when the nonaqueous electrolytic secondary battery is used at high temperatures.

Above all, a nonaqueous solvent where the total of ethylene carbonate and γ-butyrolactone occupying in the nonaqueous solvent is 80 vol % or more, preferably 90 vol % or more, and the volume ratio between ethylene carbonate and γ-butyrolactone is from 5:95 to 45:55, is preferred. Also, a nonaqueous solvent where the total of ethylene carbonate and propylene carbonate occupying in the nonaqueous solvent is 80 vol % or more, preferably 90 vol % or more, and the volume ratio between ethylene carbonate and propylene carbonate is from 30:70 to 80:20, is preferred. These nonaqueous solvents generally yield a good balance between cycle characteristics and discharge load characteristics or the like.

4. Additives

In the nonaqueous electrolytic solution of the present invention, various additives may be blended within the range not seriously impairing the effects of the present invention. As for the additive, known additives can be arbitrarily used. One kind of an additive may be used alone, or two or more kinds of additives may be used in any combination in an arbitrary ratio.

Examples of the additive include an overcharge inhibitor and an auxiliary agent for improving the capacity retention or cycle characteristics after high-temperature storage. In particular, a carbonate having at least either one of an unsaturated bond and a halogen atom (hereinafter sometimes simply referred to as "specific carbonate") is preferably added as an auxiliary agent for improving the capacity retention or cycle characteristics after high-temperature storage. The specific carbonate and other additives are separately described below.

4-1. Specific Carbonate

The specific carbonate is a carbonate having at least either one of an unsaturated bond and a halogen atom. The specific carbonate may have only an unsaturated bond or only a halogen atom only or may have an unsaturated bond and a halogen atom.

The molecular weight of the specific carbonate is not particularly limited and may be any as long as the effects of the present invention are not seriously impaired, but the molecular weight is preferably from 50 to 250, more preferably from 80 to 150. Within this range, solubility of the specific carbonate in the nonaqueous electrolytic solution is good, and the effects of the addition can be sufficiently brought out.

The production process of the specific carbonate is not particularly limited, and a known process may be arbitrarily selected and used for the production.

As for the specific carbonate, one kind of a carbonate may be incorporated alone into the nonaqueous electrolytic solution, or two or more kinds of carbonates may be incorporated in any combination in an arbitrary ratio.

The blending amount of the specific carbonate is not particularly limited and may be any as long as the effects of the present invention are not seriously impaired, but the blending amount is preferably 0.01 mass % or more, more preferably 0.1 mass % or more, still more preferably 0.3 mass % or more, and is preferably 70 mass % or less, more preferably 50 mass % or less, still more preferably 40 mass % or less, based on the nonaqueous electrolytic solution.

When the blending amount of the specific carbonate is not less than the lower limit above, a sufficiently high effect of enhancing the cycle characteristics can be given to the nonaqueous electrolytic secondary battery, and when the blending amount is not more than the upper limit, the high-temperature storage characteristics and continuous charge characteristics of the nonaqueous electrolytic secondary battery can be prevented from deterioration and also, an increase of the gas evolution or a decrease in the capacity retention can be avoided.

4-1-1. Unsaturated Carbonate

Out of specific carbonates, the carbonate having an unsaturated bond (hereinafter sometimes simply referred to as "unsaturated carbonate") is not particularly limited as long as it is a carbonate having a carbon-carbon unsaturated bond such as carbon-carbon double bond and carbon-carbon triple bond, and an arbitrary unsaturated carbonate can be used. Incidentally, a carbonate having an aromatic ring is also included in the carbonate having an unsaturated bond.

Examples of the unsaturated carbonate include vinylene carbonates, ethylene carbonates substituted with an aromatic ring or a substituent having a carbon-carbon unsaturated bond, phenyl carbonates, vinyl carbonates, and allyl carbonates.

Examples of the vinylene carbonates include vinylene carbonate, methylvinylene carbonate, 4,5-dimethylvinylene carbonate, phenylvinylene carbonate, 4,5-diphenylvinylene carbonate, and catechol carbonate.

Examples of the ethylene carbonates substituted with an aromatic ring or a substituent having a carbon-carbon unsaturated bond include vinylethylene carbonate, 4,5-divinylethylene carbonate, phenylethylene carbonate, and 4,5-diphenylethylene carbonate.

Examples of the phenyl carbonates include diphenyl carbonate, ethyl phenyl carbonate, methyl phenyl carbonate, and tert-butyl phenyl carbonate.

Examples of the vinyl carbonates include divinyl carbonate and methyl vinyl carbonate.

Examples of the allyl carbonates include diallyl carbonate and allyl methyl carbonate.

Among these, vinylene carbonates and ethylene carbonates substituted an aromatic ring or a substituent having a carbon-carbon unsaturated bond are preferred. In particular, vinylene carbonate, 4,5-diphenylvinylene carbonate, 4,5-dimethylvinylene carbonate and vinylethylene carbonate can form a stable interface protective coating and therefore, are more suitably used.

4-1-2. Halogenated Carbonate

Out of specific carbonates, the carbonate having a halogen atom (hereinafter sometimes simply referred to as "halogenated carbonate") is not particularly limited as long as it has a halogen atom, and an arbitrary halogenated carbonate can be used.

Examples of the halogen atom include fluorine atom, chlorine atom, bromine atom and iodine atom. Among these, fluorine atom and chlorine atom are preferred, and fluorine atom is more preferred. The number of halogen atoms in the halogenated carbonate is not particularly limited as long as it is 1 or more, but the number of halogen atoms is preferably 6 or less, more preferably 4 or less. In the case where the halogenated carbonate has a plurality of halogen atoms, these may be the same or different.

Examples of the halogenated carbonate include ethylene carbonate derivatives, dimethyl carbonate derivatives, ethyl methyl carbonate derivatives, and diethyl carbonate derivatives.

Examples of the ethylene carbonate derivatives include fluoroethylene carbonate, chloroethylene carbonate, 4,4-difluoroethylene carbonate, 4,5-difluoroethylene carbonate, 4,4-dichloroethylene carbonate, 4,5-dichloroethylene carbonate, 4-fluoro-4-methylethylene carbonate, 4-chloro-4-methylethylene carbonate, 4,5-difluoro-4-methylethylene carbonate, 4,5-dichloro-4-methylethylene carbonate, 4-fluoro-5-methylethylene carbonate, 4-chloro-5-methylethylene carbonate, 4,4-difluoro-5-methylethylene carbonate, 4,4-dichloro-5-methylethylene carbonate, 4-(fluoromethyl)-ethylene carbonate, 4-(chloromethyl)-ethylene carbonate, 4-(difluoromethyl)-ethylene carbonate, 4-(dichloromethyl)-ethylene carbonate, 4-(trifluoromethyl)-ethylene carbonate, 4-(trichloromethyl)-ethylene carbonate, 4-(fluoromethyl)-4-fluoroethylene carbonate, 4-(chloromethyl)-4-chloroethylene carbonate, 4-(fluoromethyl)-5-fluoroethylene carbonate, 4-(chloromethyl)-5-chloroethylene carbonate, 4-fluoro-4,5-dimethylethylene carbonate, 4-chloro-4,5-dimethylethylene carbonate, 4,5-difluoro-4,5-dimethylethylene carbonate, 4,5-dichloro-4,5-dimethylethylene carbonate, 4,4-difluoro-5,5-dimethylethylene carbonate, and 4,4-dichloro-5,5-dimethylethylene carbonate.

Examples of the dimethyl carbonate derivatives include fluoromethyl methyl carbonate, difluoromethyl methyl carbonate, trifluoromethyl methyl carbonate, bis(fluoromethyl), bis(difluoro)methyl carbonate, bis(trifluoro)methyl carbonate, chloromethyl methyl carbonate, dichloromethyl methyl carbonate, trichloromethyl methyl carbonate, bis(chloromethyl)carbonate, bis(dichloro)methyl carbonate, and bis(trichloro)methyl carbonate.

Examples of the ethyl methyl carbonate derivatives include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, ethyl trifluoromethyl carbonate, 2-chloroethyl methyl carbonate, ethyl chloromethyl carbonate, 2,2-dichloroethyl methyl carbonate, 2-chloroethyl chloromethyl carbonate, ethyl dichloromethyl carbonate, 2,2,2-trichloroethyl methyl carbonate, 2,2-dichloroethyl chloromethyl carbonate, 2-chloroethyl dichloromethyl carbonate, and ethyl trichloromethyl carbonate.

Examples of the diethyl carbonate derivatives include ethyl-(2-fluoroethyl)carbonate, ethyl-(2,2-difluoroethyl)carbonate, bis(2-fluoroethyl)carbonate, ethyl-(2,2,2-trifluoroethyl)carbonate, 2,2-difluoroethyl-2'-fluoroethyl carbonate, bis(2,2-difluoroethyl)carbonate, 2,2,2-trifluoroethyl-2'-fluoroethyl carbonate, 2,2,2-trifluoroethyl-2',2'-difluoroethyl carbonate, bis(2,2,2-trifluoroethyl)carbonate, ethyl-(2-chloroethyl)carbonate, ethyl-(2,2-dichloroethyl)carbonate, bis(2- chloroethyl)carbonate, ethyl-(2,2,2-trichloroethyl)carbonate, 2,2-dichloroethyl-2'-chloroethyl carbonate, bis(2,2-dichloroethyl)carbonate, 2,2,2-trichloroethyl-2'-chloroethyl carbonate, 2,2,2-trichloroethyl-2',2'-dichloroethyl carbonate, and bis(2,2,2-trichloroethyl)carbonate.

Among these, carbonates having fluorine atom are preferred, ethylene carbonate derivatives having fluorine atom are more preferred. In particular, fluoroethylene carbonate, 4-(fluoromethyl)-ethylene carbonate, 4,4-difluoroethylene carbonate and 4,5-difluoroethylene carbonate can form a stable interface protective coating and are more suitably used.

4-1-3. Halogenated Unsaturated Carbonate

Furthermore, a carbonate having both an unsaturated bond and a halogen atom (arbitrarily, this carbonate is simply referred to as "halogenated unsaturated carbonate") can also be used as the specific carbonate. The halogenated unsaturated carbonate is not particularly limited, and an arbitrary halogenated unsaturated carbonate can be used as long as the effects of the present invention are not seriously impaired.

Examples of the halogenated unsaturated carbonate include vinylene carbonate derivatives, ethylene carbonate derivatives substituted with an aromatic ring or a substituent having a carbon-carbon unsaturated bond, phenyl carbonate derivatives, vinyl carbonate derivatives and allyl carbonate derivatives.

Examples of the vinylene carbonate derivatives include fluorovinylene carbonate, 4-fluoro-5-methylvinylene carbonate, 4-fluoro-5-phenylvinylene carbonate, 4-(trifluoromethyl)vinylene carbonate, chlorovinylene carbonate, 4-chloro-5-methylvinylene carbonate, 4-chloro-5-phenylvinylene carbonate, and 4-(trichloromethyl)vinylene carbonate.

Examples of the ethylene carbonate derivatives substituted with an aromatic ring or a substituent having a carbon-carbon unsaturated bond include 4-fluoro-4-vinylethylene carbonate, 4-fluoro-5-vinyl ethylene carbonate, 4,4-difluoro-4-vinylethylene carbonate, 4,5-difluoro-4-vinylethylene carbonate, 4-chloro-5-vinylethylene carbonate, 4,4-dichloro-4-vinylethylene carbonate, 4,5-dichloro-4-vinylethylene carbonate, 4-fluoro-4,5-divinylethylene carbonate, 4,5-difluoro-4,5-divinylethylene carbonate, 4-chloro-4,5-divinylethylene carbonate, 4,5-dichloro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate, 4-chloro-4-phenylethylene carbonate, 4-chloro-5-phenylethylene carbonate, 4,4-dichloro-5-phenylethylene carbonate, 4,5-dichloro-4-phenylethylene carbonate, 4,5-difluoro-4,5-diphenylethylene carbonate, and 4,5-dichloro-4,5-diphenylethylene carbonate.

Examples of the phenyl carbonate derivatives include fluoromethyl phenyl carbonate, 2-fluoroethyl phenyl carbonate, 2,2-difluoroethyl phenyl carbonate, 2,2,2-trifluoroethyl phenyl carbonate, chloromethyl phenyl carbonate, 2-chloroethyl phenyl carbonate, 2,2-dichloroethyl phenyl carbonate, and 2,2,2-trichloroethyl phenyl carbonate.

Examples of the vinyl carbonate derivatives include fluoromethyl vinyl carbonate, 2-fluoroethyl vinyl carbonate, 2,2-difluoroethyl vinyl carbonate, 2,2,2-trifluoroethyl vinyl carbonate, chloromethyl vinyl carbonate, 2-chloroethyl vinyl carbonate, 2,2-dichloroethyl vinyl carbonate, and 2,2,2-trichloroethyl vinyl carbonate.

Examples of the allyl carbonate derivatives include fluoromethyl allyl carbonate, 2-fluoroethyl allyl carbonate, 2,2-difluoroethyl allyl carbonate, 2,2,2-trifluoroethyl allyl carbonate, chloromethyl allyl carbonate, 2-chloroethyl allyl carbonate, 2,2-dichloroethyl allyl carbonate, and 2,2,2-trichloroethyl allyl carbonate.

The specific carbonate is preferably vinylene carbonate, vinylethylene carbonate, fluoroethylene carbonate or 4,5-difluoroethylene carbonate, which are a carbonate capable of producing a high effect when used alone. A combination use of two or more of these carbonates is more preferred.

4-2. Other Additives

Examples of the additive other than the specific carbonate include an overcharge inhibitor and an auxiliary agent for improving the capacity retention and cycle characteristics after high-temperature storage.

4-2-1. Overcharge Inhibitor

Examples of the overcharge inhibitor include aromatic compounds such as toluenes, e.g., toluene and xylene; unsubstituted or alkyl-substituted biphenyls, e.g., biphenyl, 2-methylbiphenyl, 3-methylbiphenyl, and 4-methylbiphenyl; unsubstituted or alkyl-substituted terphenyls, e.g., o-terphenyl, m-terphenyl and p-terphenyl; partly hydrogenated, unsubstituted or alkyl-substituted terphenyl derivatives; cycloalkylbenzenes, e.g., cyclopentylbenzene and cyclohexylbenzene; alkylbenzenes having a tertiary carbon directly bonded to the benzene ring, e.g., cumene, 1,3-diisopropylbenzene and 14-diisopropylbenzene; alkylbenzenes having a quaternary carbon directly bonded to the benzene ring, e.g., tert-butylbenzene, tert-amylbenzene and tert-hexylbenzene; and aromatic compounds having oxygen atom, e.g., diphenyl ether and dibenzofuran.

Other examples of the overcharge inhibitor include partially fluorinated products of the aromatic compounds above, such as fluorobenzene, fluorotoluene, benzotrifluoride, 2-fluorobiphenyl, o-cyclohexylfluorobenzene and p-cyclohexylfluorobenzene; and fluorine-containing anisole compounds such as 2,4-difluoroanisole, 2,5-difluoroanisole and 1,6-difluoroanisole.

One of these overcharge inhibitors may be used alone, or two or more thereof may be used in any combination. In the case of using these in arbitrary combination, compounds classified into the same derivative may be used in combination, or compounds classified into different derivatives may be used in combination.

In the case of blending an overcharge inhibitor, the overcharge inhibitor may be blended in an arbitrary amount as long as the effects of the present invention are not seriously impaired, but based on the entire nonaqueous electrolytic solution, the lower limit is preferably 0.1 mass % or more, and the upper limit is preferably 10 mass % or less.

Blending of an overcharge inhibitor is preferred, because safety of the nonaqueous electrolytic secondary battery is enhanced even when overcharged due to, for example, an erroneous use or a failure in normal working of an overcharge protection circuit, such as abnormality of a charger.

4-2-2. Auxiliary Agent

Examples of the auxiliary agent for improving the capacity retention and cycle characteristics after high-temperature storage include an anhydride of dicarboxylic acid such as succinic acid, maleic acid and phthalic acid; a carbonate compound other than those coming under the specific carbonate, such as erythritan carbonate and spiro-bis-dimethylene carbonate; a sulfur-containing compound, for example, a cyclic sulfite such as ethylene sulfite, a cyclic sulfonic acid ester such as 1,3-propanesultone, 1,4-butanesultone, 1,3-propenesultone and 1,4-butenesultone, a chain sulfonic acid ester such as methyl methanesulfonate and busulfan, a cyclic sulfone such as sulfolane and sulfolene, a chain sulfone such as dimethyl sulfone, diphenyl sulfone and methyl phenyl sulfone, sulfides such as dibutyl disulfide, dicyclohexyl disulfide and tetramethylthiuram monosulfide, and sulfonamides such as N,N-dimethylmethanesulfonamide and N,N-diethylmethanesulfonamide; a nitrogen-containing compound such as 1-methyl-2-pyrrolidinone, 1-methyl-2-piperidone, 3-methyl-2-oxazolidinone, 1,3-dimethyl-2-imidazolidinone, N-methylsuccinimide, malononitrile, succinonitrile, adiponitrile, pimelonitrile, dodecanedinitrile and lauronitrile; a hydrocarbon compound such as heptane, octane and cycloheptane; and a fluorine-containing aromatic compound such as fluorobenzene, difluorobenzene and benzotrifluoride.

[Nonaqueous Electrolytic Secondary Battery]

The nonaqueous electrolytic secondary battery of the present invention is composed of a positive electrode, a negative electrode capable of occluding and releasing an ion, and the nonaqueous electrolytic solution of the present invention.

1. Configuration of Battery

The configuration of the nonaqueous electrolytic secondary battery of the present invention, other than the nonaqueous electrolytic solution, is the same as that of the known nonaqueous electrolytic secondary battery. Usually, the battery has a configuration where a positive electrode and a negative electrode are stacked through a porous film (separator) impregnated with a nonaqueous electrolytic solution and these members are housed in a case (housing case). The shape of the nonaqueous electrolytic secondary battery of the present invention is not particularly limited, and examples thereof include a cylindrical form, a prismatic form, a laminate form, a coin form and a large form.

2. Nonaqueous Electrolytic Solution

As for the nonaqueous electrolytic solution, the nonaqueous electrolytic solution of the present invention described above is used. Incidentally, another nonaqueous electrolytic solution may be used by mixing it with the nonaqueous electrolytic solution of the present invention within the range not deviating from the purport of the present invention.

3. Negative Electrode 3-1. Negative Electrode Active Material

The negative electrode active material is not particularly limited as long as it is a material capable of electrochemically occluding/releasing an ion. Examples thereof include a carbonaceous material, an alloy material and a lithium-containing metal composite oxide material.

3-1-1. Carbonaceous Material

The carbonaceous material is not particularly limited but in view of a good balance between the initial irreversible capacity and the charge/discharge characteristics at high current density, is preferably a carbonaceous material selected from the following (1) to (4):

(1) natural graphite, (2) an artificial carbonaceous substance or a carbonaceous material obtained by heat-treating the artificial carbonaceous substance at 400 to 3,200° C. once or more times, (3) a carbonaceous material constituting a negative electrode active material layer which is composed of at least two or more carbonaceous substances differing in the crystallinity and/or has an interface where those carbonaceous substances differing in the crystallinity are in contact with each other, and (4) a carbonaceous material constituting a negative electrode active material layer which is composed of at least two or more carbonaceous substances differing in the orientation and/or has an interface where those carbonaceous substances differing in the orientation are in contact with each other.

One of these carbonaceous materials of (1) to (4) may be used alone, or two or more thereof may be used in any combination in an arbitrary ratio.

Examples of the artificial carbonaceous substance and artificial graphitic substance in (2) above include natural graphite, coal coke, petroleum coke, coal pitch, petroleum pitch, a substance obtained by oxidizing such pitches, needle coke, pitch coke, a carbon material obtained by partly graphitizing such cokes, a pyrolysis product of an organic material, such as furnace black, acetylene black and pitch-derived carbon fiber, a carbonizable organic material, a carbonization product thereof, a solution obtained by dissolving a carbonizable organic material in a low molecular organic solvent such as benzene, toluene, xylene, quinoline and n-hexane, and a carbonization product thereof.

Examples of the carbonizable organic material include a coal tar pitch ranging from soft pitch to hard pitch, a coal-derived heavy oil such as carbonization liquefied oil, straight run heavy oil such as atmospheric residue and vacuum residue, and a cracking petroleum heavy oil such as ethylene tar that is produced as a by-product in thermal cracking of crude oil or naphtha; an aromatic hydrocarbon such as acenaphthylene, decacyclene, anthracene and phenanthrene; a nitrogen atom-containing heterocyclic compound such as phenazine and acridine; a sulfur atom-containing heterocyclic compound such as thiophene and bithiophene; a polyphenylene such as biphenyl and terphenyl; polyvinyl chloride, polyvinyl alcohol, polyvinyl butyral and insolubilized products thereof; a nitrogen-containing organic polymer such as polyacrylonitrile and polypyrrole; a sulfur-containing organic polymer such as polythiophene and polystyrene; a natural polymer such as cellulose, lignin, mannan, polygalacturonic acid, chitosan and polysaccharides typified by saccharose; a thermoplastic resin such as polyphenylene sulfide and polyphenylene oxide; and a thermosetting resin such as furfuryl alcohol resin, phenol-formaldehyde resin and imide resin.

With respect to the properties of carbonaceous material, the carbonaceous material-containing negative electrode, the electrode formation method, the current collector and the nonaqueous electrolytic secondary battery, it is preferred to satisfy any one of the following items (1) to (21) or satisfy a plurality of these items at the same time.

(1) X-Ray Parameter

The d-value (interplanar spacing) between the lattice planes (002) of the carbonaceous material as determined by X-ray diffractometry according to the method by Gakushin (the Japan Society for the Promotion of Science) is preferably 0.335 nm or more and is preferably 0.360 nm or less, more preferably 0.350 nm or less, still more preferably 0.345 nm or less. Also, the crystallite size (Lc) as determined by X-ray diffractometry according to the Gakushin method is preferably 1.0 nm or more, more preferably 1.5 nm or more, still more preferably 2 nm or more.

In the carbonaceous material obtained by coating the graphite surface with amorphous carbon, it is preferred that the core material is a graphite whose d-value between the lattice planes (002) in the X-ray diffraction is from 0.335 to 0.338 nm, a carbonaceous material whose d-value between the lattice planes (002) in the X-ray diffraction is larger than the core material is attached to the surface of the core material, and the ratio by mass between the core material and the carbonaceous material whose d-value of the lattice planes (002) in the X-ray diffraction is larger than the core material is from 99:1 to 80:20. When this material is used, a negative electrode having a high capacity and being less liable to react with the electrolytic solution can be produced.

(2) Ash Content

The ash content of the carbonaceous material is preferably 1 mass % or less, more preferably 0.5 mass % or less, still more preferably 0.1 mass % or less, based on the entire mass of the carbonaceous material, and is preferably 1 ppm or more.

(3) Volume Average Particle Diameter

As for the volume average particle diameter of the carbonaceous material, the average particle diameter (median diameter) on the volume basis as determined by the laser diffraction/scattering method is preferably 1 μm or more, more preferably 3 μm or more, still more preferably 5 μm or more, yet still more preferably 7 μm or more, and is preferably 100 μm or less, more preferably 50 μm or less, still more preferably 40 μm or less, yet still more preferably 30 μm or less, even yet still more preferably 25 μm or less.

(4) Raman R Value, Raman Half-Value Width

The Raman R value of the carbonaceous material, in terms of the value as measured by the argon ion laser Raman spectroscopy, is preferably 0.01 or more, more preferably 0.03 or more, still more preferably 0.1 or more, and is preferably 1.5 or less, more preferably 1.2 or less, still more preferably 1 or less, yet still more preferably 0.5 or less.

The Raman half-value width around 1,580 $cm^{-1}$ of the carbonaceous material is not particularly limited but is usually 10 $cm^{-1}$ or more, preferably 15 $cm^{-1}$ or more, and is usually 100 $cm^{-1}$ or less, preferably 80 $cm^{-1}$ or less, more preferably 60 $cm^{-1}$ less, still more preferably 40 $cm^{-1}$ or less.

(5) BET Specific Surface Area

The BET specific surface area of the carbonaceous material, in terms of the value of specific surface area as measured by the BET method, is preferably 0.1 $m^2 \cdot g^{-1}$ or more, more preferably 0.7 $m^2 \cdot g^{-1}$ or more, still more preferably 1.0 $m^2 \cdot g^{-1}$ or more, yet still more preferably 1.5 $m^2 \cdot g^{-1}$ or more, and is preferably 100 $m^2 \cdot g^{-1}$ or less, more preferably 25 $m^2 \cdot g^{-1}$ or less, still more preferably 15 $m^2 \cdot g^{-1}$ or less, yet still more preferably 10 $m^2 \cdot g^{-1}$ or less.

(6) Pore Size Distribution

The pore size distribution of the carbonaceous material is calculated by measuring the amount of mercury intruded. The pore size distribution of the carbonaceous material where voids in the carbonaceous material particle, unevenness due to steps on the particle surface, and pores due to contact surface or the like between particles are determined to correspond to pores having a diameter of 0.01 to 1 μm when measured by the mercury porosimetry (mercury intrusion), is preferably 0.01 $cm^3 \cdot g^{-1}$ or more, more preferably 0.05 $cm^3 \cdot g^{-1}$ or more, still more preferably 0.1 $cm^3 \cdot g^{-1}$ or more, and is preferably 0.6 $cm^3 \cdot g^{-1}$ or less, more preferably 0.4 $cm^3 \cdot g^{-1}$ or less, still more preferably 0.3 $cm^3 \cdot g^{-1}$ or less.

If the pore size distribution exceeds this range, a large amount of a binder is sometimes required at the electrode plate formation, whereas if it is less than the range above, charge/discharge characteristics at high current density may be deteriorated and the effect of relieving the expansion and contraction of the electrode during charging/discharging is not obtained in some cases.

The total volume of pores corresponding to a pore having a diameter of 0.01 to 100 μm as determined by mercury porosimetry (mercury intrusion) is preferably 0.1 $cm^3 \cdot g^{-1}$ or more, more preferably 0.25 $cm^3 \cdot g^{-1}$ or more, still more preferably 0.4 $cm^3 \cdot g^{-1}$ or more, and is preferably 10 $cm^3 \cdot g^{-1}$ or less, more preferably 5 $cm^3 \cdot g^{-1}$ or less, still more preferably 2 $cm^3 \cdot g^{-1}$ or less.

If the total pore volume exceeds this range, a large amount of a binder is sometimes required at the electrode plate formation, whereas if it is less than the range above, the effect of dispersing a thickener or a binder at the electrode plate formation may not be obtained.

The average pore size is preferably 0.05 μm or more, more preferably 0.1 μm or more, still more preferably 0.5 μm or more, and is preferably 50 μm or less, more preferably 20 μm or less, still more preferably 10 μm or less.

If the average pore size exceeds this range, a large amount of a binder is sometimes required, whereas if it is less than the range above, charge/discharge characteristics at high current density may be deteriorated.

(7) Circularity

When the circularity as the sphericity of the carbonaceous material is measured, the circularity preferably falls within the following range. The circularity is defined by "circularity=(perimeter of an equivalent-circle having the same area as that of the projected particle shape)/(actual perimeter of the projected particle shape)", and the carbonaceous material is a theoretical sphere when the circularity is 1.

The circularity of the carbonaceous material particle having a particle diameter of 3 to 40 μm is preferably closer to 1. The circularity of the particle is preferably 0.1 or more, more preferably 0.5 or more, still more preferably 0.8 or more, yet still more preferably 0.85 or more, even yet still more preferably 0.9 or more.

(8) True Density

The true density of the carbonaceous material is preferably 1.4 $g \cdot cm^{-3}$ or more, more preferably 1.6 $g \cdot cm^{-3}$ or more, still more preferably 1.8 $g \cdot cm^{-3}$ or more, yet still more preferably 2.0 $g \cdot cm^{-3}$ or more, and is preferably 2.26 $g \cdot cm^{-3}$ or less.

(9) Tap Density

The tap density of the carbonaceous material is preferably 0.1 $g \cdot cm^{-3}$ or more, more preferably 0.5 $g \cdot cm^{-3}$ or more, still more preferably 0.7 $g \cdot cm^{-3}$ or more, yet still more preferably 1 $g \cdot cm^{-3}$ or more, and is preferably 2 $g \cdot cm^{-3}$ or less, more preferably 1.8 $g \cdot cm^{-3}$ or less, still more preferably 1.6 $g \cdot cm^{-3}$ or less.

In the measurement of the tap density, a sample is passed through a sieve having an opening size of 300 μm and allowed to fall in a 20 $cm^3$ tapping cell and after the cell is filled with the sample to the top face, tapping with a stroke length of 10 mm is performed 1,000 times by using a powder density measuring instrument (for example, Tap Denser manufactured by Seishin Enterprise Co., Ltd.). From the volume here and the mass of the sample, the tap density is calculated. The tap density calculated by this measurement is defined as the tap density of the carbonaceous material in the present invention.

(10) Orientation Ratio

The orientation ratio of the carbonaceous material is preferably 0.005 or more, more preferably 0.01 or more, still more preferably 0.015 or more, and is preferably 0.67 or less.

(11) Aspect Ratio

The aspect ratio of the carbonaceous material is preferably 1 or more and is preferably 10 or less, more preferably 8 or less, still more preferably 5 or less. If the aspect ratio exceeds this range, streaking may occur at the electrode plate formation or a uniform coating surface may not be obtained, giving rise to deterioration of the charge/discharge characteristics at high current density. Incidentally, the lower limit of the range above is a theoretical lower limit of the aspect ratio of carbonaceous materials.

(12) Sub-Material Mixing

Sub-material mixing means that two or more kinds of carbonaceous materials differing in the property are contained in at least either one of the negative electrode and the negative electrode active material. The term "property" as used herein indicates one or more properties selected from the group consisting of X-ray diffraction parameter, median diameter, aspect ratio, BET specific surface area, orientation ratio, Raman R value, tap density, true density, pore distribution, circularity, and ash content.

Preferred examples of the sub-material mixing include a mixing where the volume-based particle size distribution is not symmetrical about the median diameter, a mixing where two or more kinds of carbonaceous materials differing in the Raman R value are contained, and a mixing where the carbonaceous materials differ in the X-ray diffraction parameter.

As an example of the effect of the sub-material mixing, the electrical resistance can be reduced by incorporating, as an electrically conductive material, a carbonaceous material, for example, a graphite such as natural graphite and artificial graphite or an amorphous carbon such as carbon black (e.g., acetylene black) and needle coke.

In the case of mixing an electrically conductive material as the sub-material mixing, one kind of an electrically conductive material may be mixed alone, or two or more kinds of electrically conductive materials may be mixed in any combination in an arbitrary ratio. The mixing ratio of the electrically conductive material to the carbonaceous material is preferably 0.1 mass % or more, more preferably 0.5 mass % or more, still more preferably 0.6 mass % or more, and is preferably 45 mass % or less, more preferably 40 mass % or less.

If the mixing ratio of the electrically conductive material to the carbonaceous material is less than this range, the effect of enhancing the electrical conductivity is sometimes difficult to obtain, whereas if it exceeds the range above, an increase of the initial irreversible capacity may be incurred.

(13) Production of Electrode

The electrode can be produced by using any known method as long as the effects of the present invention are not seriously impaired. For example, a binder, a solvent and if desired, a thickener, an electrically conductive material, a filler and the like are added to a negative electrode active material to form a slurry, and the slurry is coated on a current collector, dried and then pressed, whereby the electrode can be formed.

In the production of the nonaqueous secondary battery, the thickness of the negative electrode active material layer per one surface immediately before the step of injecting a nonaqueous electrolytic solution is preferably 15 μm or more, more preferably 20 μm or more, still more preferably 30 μm or more, and is preferably 150 μm or less, more preferably 120 μm or less, still more preferably 100 μm or less.

This is because if the thickness of the negative electrode active material exceeds this range, the nonaqueous electrolytic solution can hardly penetrate to the vicinity of the current collector interface and the charge/discharge characteristics at high current density may decrease, whereas if the thickness is less than the range above, the volume ratio of the current collector to the negative electrode active material increases and the battery capacity sometimes decreases. The negative electrode active material may be roll-formed to fabricate a sheet electrode or may be compression-formed to fabricate a pellet electrode.

(14) Current Collector

As for the current collector on which the negative electrode active material is held, a known current collector can be arbitrarily used. Examples of the current collector for negative electrode include a metal material such as copper, nickel, stainless steel and nickel-plated steel. Among these, copper is preferred in view of easy processability and cost.

In the case where the current collector is a metal material, examples of the shape of the current collector include metal foil, metal cylinder, metal coil, metal plate, thin metal film, expanded metal, perforated metal and metal foam. Among these, a thin metal film is preferred, a copper foil is more preferred, and a rolled copper foil produced by rolling process and an electrolytic copper foil produced by electrolytic process are still more preferred. Both a rolled copper foil by rolling process and an electrolytic copper foil by electrolytic process can be used as a current collector.

In the case where the thickness of a copper foil is less than 25 μm, a copper alloy (e.g., phosphor bronze, titanium-copper, Corson alloy, Cu—Cr—Zr alloy) having a higher strength than pure copper can be used.

In the current collector formed of a copper foil produced by rolling process, copper crystals are oriented in the rolling direction. Therefore, cracking hardly occurs even when the negative electrode is rolled tightly or rolled at an acute angle, and this current collector can be suitably used in a small cylindrical battery.

The electrolytic copper foil is obtained, for example, by immersing a metal-made drum in a nonaqueous electrolytic solution having dissolved therein copper ion, flowing a current while rotating the drum to deposit copper on the drum surface, and separating the copper. Copper may also be deposited on the rolled copper foil surface by electrolytic process. One surface or both surfaces of the copper foil may be subjected to a surface roughening treatment or a surface treatment (for example, a chromate treatment to a thickness of approximately from several nm to 1 μm or a primer treatment such as Ti).

(15) Thickness Ratio Between Current Collector and Negative Electrode Active Material Layer The thickness ratio between the current collector and the negative electrode active material layer is not particularly limited, but the value of "(thickness of the negative electrode active material layer on one surface immediately before the step of injecting the nonaqueous electrolytic solution)/(thickness of the current collector)" is preferably 150 or less, more preferably 20 or less, still more preferably 10 or less, and is preferably 0.1 or more, more preferably 0.4 or more, still more preferably 1 or more.

If the thickness ratio between the current collector and the negative electrode active material layer exceeds this range, the current collector sometimes shows exothermic behavior due to Joule heat during charging/discharging at high current density, whereas if the thickness ratio is less than the range above, the volume ratio of the current collector to the negative electrode active material increases and the battery capacity may decrease.

(16) Electrode Density

The electrode structure at the electrode formation of the negative electrode active material is not particularly limited, and the density of the negative electrode active material present on the current collector is preferably 1 $g \cdot cm^{-3}$ or more, more preferably 1.2 $g \cdot cm^{-3}$ or more, still more preferably 1.3 $g \cdot cm^{-3}$ or more, and is preferably 2 $g \cdot cm^{-3}$ or less, more preferably 1.9 $g \cdot cm^{-3}$ or less, still more preferably 1.8 $g \cdot cm^{-3}$ or less, yet still more preferably 1.7 $g \cdot cm^{-3}$ or less.

If the density of the negative electrode active material present on the current collector exceeds this range, the negative electrode active material particle may be broken and this may cause an increase of the initial irreversible capacity or lead to deterioration of the charge/discharge characteristics at high current density due to reduced penetration of the nonaqueous electrolytic solution to the vicinity of the current collector/negative electrode active material interface, whereas if the density is less than the range above, the electrical conductivity between negative electrode active materials may decrease and the battery resistance may increase, giving rise to reduction in the capacity per unit volume.

(17) Binder

The binder for binding negative electrode active materials is not particularly limited as long as it is a material stable to the nonaqueous electrolytic solution and the solvent used at the production of the electrode.

Examples of the binder include a resin-based polymer such as polyethylene, polypropylene, polyethylene terephthalate, polymethyl methacrylate, aromatic polyamide, cellulose and nitrocellulose; a rubbery polymer such as SBR (styrene-butadiene rubber), isoprene rubber, butadiene rubber, fluororubber, NBR (acrylonitrile-butadiene rubber) and ethylene-propylene rubber; a styrene-butadiene-styrene block copolymer and a hydrogenation product thereof; a thermoplastic elastomeric polymer such as EPDM (ethylene-propylene-diene terpolymer), styrene-ethylene-butadiene-styrene copolymer, styrene-isoprene-styrene block copolymer and hydrogenation product thereof; a soft resinous polymer such as syndiotactic-1,2-polybutadiene, polyvinyl acetate, ethylene-vinyl acetate copolymer and propylene-α-olefin copolymer; a fluoropolymer such as polyvinylidene fluoride, polytetrafluoroethylene, fluorinated polyvinylidene fluoride and polytetrafluoroethylene-ethylene copolymer; and an ion-conductive polymer composition of an alkali metal ion (particularly, lithium ion). One of these binders may be used alone, or two or more thereof may be used in any combination in an arbitrary ratio.

The solvent for forming a slurry is not particularly limited in its kind as long as it is a solvent capable of dissolving or dispersing the negative electrode active material and a binder as well as a thickener and an electrically conductive material which are used, if desired, and either an aqueous solvent or an organic solvent may be used.

The ratio of the binder to the negative electrode active material is preferably 0.1 mass % or more, more preferably 0.5 mass % or more, still more preferably 0.6 mass % or more, and is preferably 20 mass % or less, more preferably 15 mass % or less, still more preferably 10 mass % or less, yet still more preferably 8 mass % or less.

If the ratio of the binder to the negative electrode active material exceeds this range, the proportion of the binder that does not contribute to the battery capacity may increase in the binder amount to incur a decrease of the battery capacity, whereas if the ratio is less than the range above, reduction in the strength of the negative electrode is sometimes incurred.

In particular, when a rubbery polymer typified by SBR is contained as a major component, the ratio of the binder to the negative electrode active material is preferably 0.1 mass % or more, more preferably 0.5 mass % or more, still more preferably 0.6 mass % or more, and is preferably 5 mass % or less, more preferably 3 mass % or less, still more preferably 2 mass % or less.

In the case where a fluoropolymer typified by polyvinylidene fluoride is contained as a major component, the ratio of the binder to the negative electrode active material is preferably 1 mass % or more, more preferably 2 mass % or more, still more preferably 3 mass % or more, and is preferably 15 mass % or less, more preferably 10 mass % or less, still more preferably 8 mass % or less.

A thickener is usually used for controlling the viscosity of the slurry. The thickener is not particularly limited, and examples thereof include carboxymethyl cellulose, methyl cellulose, hydroxymethyl cellulose, ethyl cellulose, polyvinyl alcohol, oxidized starch, phosphated starch, casein, and salts thereof. One of these thickeners may be used alone, or two or more thereof may be used in any combination in an arbitrary ratio.

In the case of using a thickener, the ratio of the thickener to the negative electrode active material is preferably 0.1 mass % or more, more preferably 0.5 mass % or more, still more preferably 0.6 mass % or more, and is preferably 5 mass % or less, more preferably 3 mass % or less, still more preferably 2 mass % or less.

If the ratio of the thickener to the negative electrode active material is less than this range, the coatability may be significantly impaired, whereas if the ratio exceeds the range above, the proportion of the negative electrode active material occupying in the negative electrode active material layer decreases and this may cause a problem of reduction in the battery capacity or lead to an increase in the resistance between negative electrode active materials.

(18) Electrode Plate Orientation Ratio

The electrode plate orientation ratio is preferably 0.001 or more, more preferably 0.005 or more, still more preferably 0.01 or more, and is preferably 0.67 or less. If the electrode plate orientation ratio is less than the range above, the charge/discharge characteristics at high density may decrease. Incidentally, the upper limit of the above-described range is a theoretical upper limit of the electrode plate orientation ratio of carbonaceous materials.

(19) Impedance

The resistance of the negative electrode when the battery is charged to 60% of the nominal capacity from discharged state is preferably 100Ω or less, more preferably 50Ω or less, still more preferably 20Ω or less. Also, the double-layer capacity of the negative electrode when the battery is charged to 60% of the nominal capacity from discharged state is preferably $1\times10^{-6}$ F or more, more preferably $1\times10^{-5}$ F or more, still more preferably $1\times10^{-4}$ F. This is because when a negative electrode within the ranges above is used, good output characteristics are advantageously obtained.

(20) Area of Negative Electrode Plate

The area of the negative electrode plate is not particularly limited, but the negative electrode plate is preferably designed to be slightly larger than the opposite positive electrode plate so that the positive electrode plate is not allowed to protrude outward from the negative electrode plate. In view of cycle life after repeated charging and discharging or from the standpoint of suppressing the deterioration due to high-temperature storage, the area of the negative electrode is preferably as close to that of the positive electrode as possible, because the proportion of the electrode working more uniformly and effectively is increased and the characteristics are thereby enhanced. Particularly, in use at a large current, the design of the electrode area is important.

(21) Thickness of Negative Electrode Plate

The thickness of the negative electrode plate is designed in combination with the positive electrode plate used and is not particularly limited, but the thickness of the mix layer excluding the thickness of the core metal foil is preferably 15 μm or more, more preferably 20 μm or more, still more preferably 30 μm or more, and is preferably 150 μm or less, more preferably 120 μm or less, still more preferably 100 μm or less.

3-3-2. Alloy-Based Material

The alloy-based material is not particularly limited as long as it can occlude and release lithium, and includes, for example, an elemental metal or alloy capable of forming lithium alloy, and a compound thereof, such as oxide, carbide, nitride, silicide, sulfide and phosphide. Examples of the metal compound include compounds containing a metal such as silver (Ag), aluminum (Al), barium (Ba), bismuth (Bi), copper (Cu), gallium (Ga), germanium (Ge), indium (In), nickel (Ni), phosphorus (P), lead (Pb), antimony (Sb), silicon (Si), tin (Sn), strontium (Sr) and or zinc (Zn).

Above all, an elemental metal or alloy capable of forming a lithium alloy is preferred, a material containing a metal or semimetal (that is, excluding carbon) belonging to Group 13 or Group 14 is more preferred, and an elemental metal of aluminum (Al), silicon (Si) or tin (Sn), (hereinafter, these elements are sometimes simply referred to as a "specific metal element"), an alloy containing such a metal, and a compound of the specific metal element are still more preferred. One of these may be used alone, or two or more thereof may be used in any combination in an arbitrary ratio.

Examples of the negative electrode active material containing at least one member selected from the specific metal elements include: an elemental metal of any one kind of a specific metal element; an alloy composed of two or more kinds of specific metal elements; an alloy composed of one kind or two or more kinds of specific metal elements and one kind or two or more kinds of other metal elements; a compound containing one kind or two or more kinds of specific metallic elements; and a composite compound such as oxide, carbide, nitride, silicide, sulfide and phosphide of the compound above. By using the elemental metal, alloy or metal compound as the negative electrode active material, the capacity of the battery can be increased.

Also, specific examples include a compound where the composite compound above is complicatedly bonded to an elemental metal, an alloy or several kinds of elements such as nonmetallic element. More specifically, as regards silicon and tin, an alloy of such an element and a metal incapable of acting as a negative electrode may be used. In the case of tin, a complicated compound containing five or six kinds of elements, obtained by combining tin and a metal capable of acting as a negative electrode, except for silicon, with a metal incapable of acting as a negative electrode, and a nonmetallic element, can also be used.

Above all, an elemental metal of any one kind of a specific metal element, an alloy of two or more kinds of specific metal elements, and an oxide, carbide, nitride or the like of a specific metal element are preferred because of large capacity per unit mass of the battery fabricated. In particular, an elemental metal, an alloy, an oxide, a carbide, a nitride and the like of at least either one of silicon and tin are preferred in view of capacity per unit mass and environmental load.

The following compounds containing at least either one of silicon and tin are also preferred, because of excellent cycle characteristics, though the capacity per unit mass tends to be poor as compared with the case of using an elemental metal or an alloy.

"An oxide of at least either one of silicon and tin" in which the elemental ratio of at least either one of silicon and tine to oxygen is usually 0.5 or more, preferably 0.7 or more, more preferably 0.9 or more, and is usually 1.5 or less, preferably 1.3 or less, more preferably 1.1 or less.

"A nitride of at least either one of silicon and tin" in which the elemental ratio of at least either one of silicon and tin to nitrogen is usually 0.5 or more, preferably 0.7 or more, more preferably 0.9 or more, and is usually 1.5 or less, preferably 1.3 or less, more preferably 1.1 or less.

"A carbide of at least either one of silicon and tin" in which the elemental ratio of at least either one of silicon and tin to carbon is usually 0.5 or more, preferably 0.7 or more, more preferably 0.9 or more, and is usually 1.5 or less, preferably 1.3 or less, more preferably 1.1 or less.

Any one of these negative electrode active materials may be used alone, or two or more thereof may be used in any combination in an arbitrary ratio.

The negative electrode in the nonaqueous electrolytic secondary battery of the present invention can be produced using any known method. Examples of the method for producing the negative electrode include a method where a mixture obtained by adding a binder, an electrically conductive material and the like to the above-described negative electrode active material is directly roll-formed to produce a sheet electrode, and a method of compression-forming the mixture to produce a pellet electrode.

Usually, a method of forming a thin film layer containing the above-described negative electrode active (negative electrode active material layer) on a current collector for negative electrode (hereinafter sometimes simply referred to as "negative electrode current collector") by a technique such as coating, vapor deposition, sputtering and plating is used. In this case, a binder, a thickener, an electrically conductive material, a solvent and the like are added to the negative electrode active material to form a slurry, and the slurry is coated on a negative electrode current collector, dried and then pressed to densify the electrode, whereby a negative electrode active material layer is formed on a negative electrode current collector.

Examples of the material of the negative electrode current collector include copper, copper alloy, nickel, nickel alloy and stainless steel. Among these, copper foil is preferred in view of easy processability and cost.

The thickness of the negative electrode current collector is preferably 1 µm or more, more preferably 5 µm or more, and is preferably 100 µm or less, more preferably 50 µm or less. This is because if the thickness of the negative electrode current collector is too large, the capacity of the entire battery may decrease excessively, whereas if the thickness is too small, handling sometimes becomes difficult.

Incidentally, the surface of the negative electrode current collector is preferably subjected to a surface roughening treatment in advance so as to enhance the binding effect to the negative electrode active material layer formed on the surface. Examples of the surface roughening method include blasting; rolling with a rough-surfaced roll; mechanical polishing of polishing the current collector surface with an abrasive cloth or paper having fixed thereto abrasive particles, a grindstone, an emery wheel, or a wire brush equipped with steel wires; electrolytic polishing; and chemical polishing.

The slurry for forming the negative electrode active material layer is produced by adding a binder, a thickener and the like to a negative electrode active material and an electrically conductive material.

The content of the negative electrode active material in the total of the negative electrode active material and the electrically conductive material is preferably 70 mass % or more, more preferably 75 mass % or more, and is preferably 97 mass % or less, more preferably 95 mass % or less. If the content of the negative electrode active material is too small, the non-aqueous electrolytic secondary battery tends to have insufficient capacity, whereas if the content is too large, the content of the binder and the like is relatively reduced and the negative electrode obtained is liable to have insufficient strength. Incidentally, in the case of using two or more kinds of negative electrode active materials in combination, these negative electrode active materials may be used such that the total amount thereof satisfies the range above.

Examples of the electrically conductive material include a metal material such as copper and nickel; and a carbon material such as graphite and carbon black. One of these materials may be used alone, or two or more thereof may be used in any combination in an arbitrary ratio. In particular, when a carbon material is used as the electrically conductive material, the carbon material acts also as an active material and this is preferred.

The content of the electrically conductive material in the total of the negative electrode active material and the electrically conductive material is preferably 3 mass % or more, more preferably 5 mass % or more, and is preferably 30 mass % or less, more preferably 25 mass % or less. This is because if the content of the electrically conductive material is too small, the electrical conductivity tends to be insufficient, whereas if the content is too large, the content of the negative electrode active material and the like is relatively reduced and the capacity and strength of the battery are liable to decrease. Incidentally, in the case of using two or more kinds of electrically conductive materials in combination, these electrically conductive materials may be used such that the total amount thereof satisfies the range above.

As for the binder, any binder may be used as long as it is a material safe to the solvent or electrolytic solution used at the production of the electrode. Examples thereof include polyvinylidene fluoride, polytetrafluoroethylene, polyethylene, polypropylene, styrene-butadiene rubber, isoprene rubber, butadiene rubber, an ethylene-acrylic acid copolymer, and an ethylene-methacrylic acid copolymer. One of these binders may be used alone, or two or more thereof may be used in any combination in an arbitrary ratio.

The content of the binder is preferably 0.5 parts by mass or more, more preferably 1 part by mass or more, and is preferably 10 parts by mass or less, more preferably 8 parts by mass or less, per 100 parts by mass in total of the negative electrode active material and the electrically conductive material. This is because if the content of the binder is too small, the electrode obtained tends to have insufficient strength, whereas if the content is too large, the content of the negative electrode active material and the like is relatively reduced and the capacity or electrical conductivity of the battery is liable to decrease. Incidentally, in the case of using two or more kinds of binders in combination, these binders may be used such that the total amount thereof satisfies the range above.

Examples of the thickener include carboxymethyl cellulose, methyl cellulose, hydroxymethyl cellulose, ethyl cellulose, polyvinyl alcohol, oxidized starch, phosphated starch and casein. One of these thickeners may be used alone, or two or more thereof may be used in any combination in an arbitrary ratio. The thickener may be used, if desired, but in the case of using it, the content of the thickener in the negative electrode active material layer is preferably 0.5 mass % or more and is more preferably 5 mass % or less.

The slurry is prepared by mixing the negative electrode active material with, if desired, an electrically conductive material, a binder and a thickener by using an aqueous solvent or an organic solvent as the dispersion medium.

Water can be used as the aqueous solvent, but a solvent other than water, such as an alcohols (e.g., ethanol) and cyclic amides (e.g., N-methylpyrrolidone), can also be used in combination in a ratio of about 30 mass % or less based on the water.

Examples of the organic solvent include cyclic amides such as N-methylpyrrolidone, linear amides such as N,N-dimethylformamide and N,N-dimethylacetamide, aromatic hydrocarbons such as anisole, toluene and xylene, and alcohols such as butanol and cyclohexanol. Among these, cyclic amides such as N-methylpyrrolidone and linear amides such as N,N-dimethylformamide and N,N-dimethylacetamide are preferred. One of these organic solvents may be used alone, or two or more thereof may be used in any combination in an arbitrary ratio.

The viscosity of the slurry is not particularly limited as long as it is a viscosity enabling coating on a current collector. The viscosity may be appropriately adjusted by changing the amount or the like of the solvent used at the preparation of the slurry to give a coatable viscosity.

The slurry obtained is coated on the above-described negative electrode current collector, dried and then pressed, whereby a negative electrode active material layer can be formed. The coating method is not particularly limited, and a known method can be used. The drying method is also not particularly limited and, for example, a known method such as natural drying, drying by heating, and reduced-pressure drying can be used.

The electrode structure at the electrode formation of the negative electrode active material by the method above is not particularly limited, but the density of the active material present on the current collector is preferably 1 g·cm$^{-3}$ or more, more preferably 1.2 g·cm$^{-3}$ or more, still more preferably 1.3 g·cm$^{-3}$ or more, and is preferably 2 g·cm$^{-3}$ or less, more preferably 1.9 g·cm$^{-3}$ or less, still more preferably 1.8 g·cm$^{-3}$ or less, yet still more preferably 1.7 g·cm$^{-3}$ or less.

If the density of the active material present on the current collector exceeds this range, the active material particle may be broken and this may cause an increase of the initial irreversible capacity or lead to deterioration of the charge/discharge characteristics at high current density due to reduced penetration of the nonaqueous electrolytic solution to the vicinity of the current collector/active material interface, whereas if the density is less than the range above, the electrical conductivity between active materials may decrease and the battery resistance may increase, giving rise to reduction in the capacity per unit volume.

3-3-3. Lithium-Containing Metal Composite Oxide Material

The lithium-containing metal composite oxide material used as the negative electrode active material is not particularly limited as long as it can occlude/release lithium, but a lithium-containing composite metal oxide material containing titanium is preferred, and a composite oxide of lithium and titanium (hereinafter sometimes simply referred to "lithium-titanium composite oxide") is more preferred. That is, when a lithium-titanium composite oxide having a spinel structure is used by incorporating it in a negative electrode active material for lithium ion secondary batteries, the output resistance is greatly reduced, and therefore, this is particularly preferred.

A lithium-titanium composite oxide in which at least either one of lithium and titanium is replaced by another metal element, for example, at least one element selected from the group consisting of sodium (Na), potassium (K), cobalt (Co), aluminum (Al), iron (Fe), titanium (Ti), magnesium (Mg), chromium (Cr), gallium (Ga), copper (Cu), zinc (Zn) and niobium (Nb), is also preferred.

A lithium-titanium composite oxide represented by:

Formula (1):

$$Li_xTi_yM_zO_4 \tag{1}$$

wherein M represents at least one element selected from the group consisting of sodium (Na), potassium (K), cobalt (Co), aluminum (Al), iron (Fe), titanium (Ti), magnesium (Mg), chromium (Cr), gallium (Ga), copper (Cu), zinc (Zn) and niobium (Nb), $0.7 \leq x \leq 1.55$, $1.5 \leq y \leq 2.3$, and $0 \leq z \leq 1.6$, is preferred because the structure when doping/dedoping lithium ion is stable.

A structure where in formula (1),
(a) $1.2 \leq x \leq 1.4$, $1.5 \leq y \leq 1.7$, and $z=0$,
(b) $0.9 \leq x \leq 1.1$, $1.9 \leq y \leq 2.1$, and $z=0$, or
(c) $0.7 \leq x \leq 0.9$, $2.1 \leq y \leq 2.3$, and $z=0$
is preferred because of a good balance among battery performances.

Representative compositions include $Li_{4/3}Ti_{5/3}O_4$ for (a), $Li_1Ti_2O_4$ for (b), and $Li_{4/5}Ti_{11/5}O_4$ for (c). As for the structure where z is not 0, for example, $Li_{4/3}Ti_{4/3}Al_{1/3}O_4$ is preferred.

In addition to the requirements above, the lithium-titanium composite oxide preferably satisfies, out of physical properties and characteristic features such as shape shown in (1) to (16) below, at least one item, more preferably a plurality of items at the same time.

(1) BET Specific Surface Area

The BET specific surface area of the lithium-titanium composite oxide, in terms of the value of specific surface area as measured by the BET method, is preferably 0.5 $m^2 \cdot g^{-1}$ or more, more preferably 0.7 $m^2 \cdot g^{-1}$ or more, still more preferably 1.0 $m^2 \cdot g^{-1}$ or more, yet still more preferably 1.5 $m^2 \cdot g^{-1}$ or more, and is preferably 200 $m^2 \cdot g^{-1}$ or less, more preferably 100 $m^2 \cdot g^{-1}$ or less, still more preferably 50 $m^2 \cdot g^{-1}$ or less, yet still more preferably 25 $m^2 \cdot g^{-1}$ or less.

(2) Volume Average Particle Diameter

The volume average particle diameter (the secondary particle diameter when a secondary particle is formed resulting from aggregation of primary particles) of the lithium-titanium composite oxide is defined as the volume average particle diameter (median diameter) determined by the laser diffraction/scattering method.

The volume average particle diameter of the lithium-titanium composite oxide is preferably 0.1 μm or more, more preferably 0.5 μm or more, still more preferably 0.7 μm or more, and is preferably 50 μm or less, more preferably 40 μm or less, still more preferably 30 μm or less, yet still more preferably 25 μm or less.

(3) Average Primary Particle Diameter

In the case where a secondary particle is formed resulting from aggregation of primary particles, the average primary particle diameter of the lithium-titanium composite oxide is preferably 0.01 μm or more, more preferably 0.05 μm or more, still more preferably 0.1 μm or more, yet still more preferably 0.2 μm or more, and is preferably 2 μm or less, more preferably 1.6 μm or less, still more preferably 1.3 μm or less, yet still more preferably 1 μm or less.

If the volume average primary particle diameter exceeds this range, spherical secondary particles are difficult to form and this adversely affects the powder packing or leads to great reduction in the specific surface area, giving rise to a high possibility that the battery performance such as output characteristics decreases, whereas if it is less than the range above, crystals are usually not grown and therefore, the performance of the secondary battery may deteriorate, for example, poor charge/discharge reversibility may result.

(4) Shape

The shape of the lithium-titanium composite oxide particle is not particularly limited, and examples thereof include massive form, polyhedral form, spherical form, ellipsoidal form, plate form, needle form and columnar form. Above all, a particle which is a secondary particle formed by the aggregation of primary particles and in which the shape of the secondary particle is a spherical or ellipsoidal form, is preferred.

In an electrochemical device, the active material in the electrode usually undergoes expansion/contraction as the device is charged/discharged and due to the stress thereof, deterioration such as breakage of active material and breakage of conduction path is liable to occur. Therefore, an active material in which a secondary particle is formed resulting from aggregation of primary particles is preferred, because this active material can relieve the stress of expansion/contraction and prevent deterioration as compared with an active material composed of a single particle, that is, only primary particles.

Also, a spherical or ellipsoidal particle is better than an axial orientation particle such as plate-like particle, because the spherical or ellipsoidal particle ensures little orientation at the electrode formation, reduces expansion/contraction of the electrode during charging/discharging and is liable to be uniformly mixed in the mixing with an electrically conductive material at the production of the electrode.

(5) Tap Density

The tap density of the lithium-titanium composite oxide is preferably 0.05 $g \cdot cm^{-3}$ or more, more preferably 0.1 $g \cdot cm^{-3}$ or more, still more preferably 0.2 $g \cdot cm^{-3}$ or more, yet still more preferably 0.4 $g \cdot cm^{-3}$ or more, and is preferably 2.8 $g \cdot cm^{-3}$ or less, more preferably 2.4 $g \cdot cm^{-3}$ or less, still more preferably 2 $g \cdot cm^{-3}$ or less.

If the tap density is less than this range, the packing density when used as a negative electrode can hardly increase or due to decrease in the contact area between particles, the output resistance sometimes increases, whereas if the tap density exceeds the range above, the number of voids between particles in the electrode becomes excessively small and the flow channels for the nonaqueous electrolytic solution are decreased, which may cause an increase in the output resistance.

In the measurement of the tap density, a sample is passed through a sieve having an opening size of 300 μm and allowed to fall in a 20 $cm^3$ tapping cell and after the cell is filled with the sample to the top face, tapping with a stroke length of 10 mm is performed 1,000 times by using a powder density measuring instrument (for example, Tap Denser manufactured by Seishin Enterprise Co., Ltd.). From the volume here and the mass of the sample, the density is calculated. The tap density calculated by this measurement is defined as the tap density of the lithium-titanium composite oxide in the present invention.

(6) Circularity

When the circularity as the sphericity of the lithium-titanium composite oxide is measured, the circularity preferably falls within the following range. The circularity is defined by "circularity=(perimeter of an equivalent-circle having the same area as that of the projected particle shape)/(actual perimeter of the projected particle shape)", and the lithium-titanium composite oxide is a theoretical sphere when the circularity is 1.

The circularity of the lithium-titanium composite oxide is preferably closer to 1 and is usually 0.10 or more, preferably 0.80 or more, more preferably 0.85 or more, still more preferably 0.90 or more. As the circularity is larger, the charge/discharge characteristics at high current density are more improved. Accordingly, if the circularity is less than the range above, the packability of the negative electrode active material may decrease and the resistance between particles may increase, giving rise to reduction in the short-time charge/discharge characteristics at high current density.

(7) Aspect Ratio

The aspect ratio of the lithium-titanium composite oxide is preferably 1 or more, and is preferably 5 or less, more preferably 4 or less, still more preferably 3 or less, yet still more preferably 2 or less. If the aspect ratio exceeds this range, streaking may occur at the electrode plate formation or a uniform coating surface may not be obtained, giving rise to reduction in the short-time charge/discharge characteristics at high current density. Incidentally, the lower limit of the above-described range is a theoretical lower limit of the aspect ratio of lithium-titanium composite oxides.

(8) Production Process of Negative Electrode Active Material

The production process of the lithium-titanium composite oxide is not particularly limited, and a method generally used as the production process of an inorganic compound can be employed.

Examples thereof include a method in which a titanium source material such as titanium oxide and, if desired, source materials of other elements are uniformly mixed with a lithium source such as LiOH, $Li_2CO_3$ and $LiNO_3$ and the mixture is burned at a high temperature to obtain an active material.

In particular, for producing a spherical or ellipsoidal active material, various methods may be considered. For example, the following method may be used. That is, a titanium source material such as titanium oxide and, if desired, source materials of other elements are dissolved or pulverized/dispersed in a solvent such as water, the pH is adjusted with stirring to prepare a spherical precursor, the precursor is recovered and, if desired, dried, a lithium source such as LiOH, $Li_2CO_3$ and $LiNO_3$ is added thereto, and the mixture is burned at a high temperature to obtain an active material.

As another method, the following method may be used. That is, a titanium source material such as titanium oxide and, if desired, source materials of other elements are dissolved or pulverized/dispersed in a solvent such as water, the solution or dispersion is dry-formed with a spray dryer or the like to obtain a spherical or ellipsoidal precursor, a Li source such as LiOH, $Li_2CO_3$ and $LiNO_3$ is added to the precursor, and the mixture is burned at a high temperature to obtain an active material.

As still another example, the following method may be used. That is, a titanium source material such as titanium oxide, a Li source such as LiOH, $Li_2CO_3$ and $LiNO_3$ and, if desired, source materials of other elements are dissolved or pulverized/dispersed in a solvent such as water, the solution or dispersion is dry-formed with a spray dryer or the like to obtain a spherical or ellipsoidal precursor, and the precursor is burned at a high temperature to obtain an active material.

In these steps, an element other than titanium (Ti), for example, aluminum (Al), manganese (Mn), vanadium (V), chromium (Cr), manganese (Mn), iron (Fe), cobalt (Co), lithium (Li), nickel (Ni), copper (Cu), zinc (Zn), magnesium (Mg), gallium (Ga), zirconium (Zr), carbon (C), silicon (Si), tin (Sn) or silver (Ag), is allowed to be present in the form of contacting with at least either one of the titanium-containing metal oxide structure and the titanium-containing oxide. By containing such an element, the operating voltage and capacity of the battery can be controlled.

(9) Production of Electrode

The electrode can be produced by using any known method. For example, a binder, a solvent and if desired, a thickener, an electrically conductive material, a filler and the like are added to a negative electrode active material to form a slurry, and the slurry is coated on a current collector, dried and then pressed, whereby the electrode can be formed.

In the production of the nonaqueous secondary battery, the thickness of the negative electrode active material layer per one surface immediately before the step of injecting a nonaqueous electrolytic solution is preferably 15 µm or more, more preferably 20 µm or more, still more preferably 30 µm or more, and is preferably 150 µm or less, more preferably 120 µm or less, still more preferably 100 µm or less.

If the thickness exceeds this range, the nonaqueous electrolytic solution can hardly penetrate to the vicinity of the current collector interface and the charge/discharge characteristics at high current density may decrease, whereas if the thickness is less than the range above, the volume ratio of the current collector to the negative electrode active material increases and the battery capacity sometimes decreases. The negative electrode active material may be roll-formed to fabricate a sheet electrode or may be compression-formed to fabricate a pellet electrode.

(10) Current Collector

As for the current collector, a known current collector can be used. Examples of the current collector for negative electrode include a metal material such as copper, nickel, stainless steel and nickel-plated steel. Among these, copper is preferred in view of easy processability and cost.

In the case where the current collector is a metal material, examples of the shape of the current collector include metal foil, metal cylinder, metal coil, metal plate, thin metal film, expanded metal, perforated metal and metal foam. Among these, a thin metal film containing at least either one of copper (Cu) and aluminum (Al) is preferred, a copper foil and an aluminum foil are more preferred, and a rolled copper foil produced by rolling process and an electrolytic copper foil produced by electrolytic process are still more preferred. Both a rolled copper foil by rolling process and an electrolytic copper foil by electrolytic process can be used as a current collector.

In the case where the thickness of a copper foil is less than 25 µm, a copper alloy (e.g., phosphor bronze, titanium-copper, Corson alloy, Cu—Cr—Zr alloy) having a higher strength than pure copper can be used. Also, an aluminum foil has a low specific gravity and can be preferably used, because when used as a current collector, the mass of the battery can be reduced.

In the current collector formed of a copper foil produced by rolling process, copper crystals are oriented in the rolling direction. Therefore, cracking hardly occurs even when the negative electrode is rolled tightly or rolled at an acute angle, and this current collector can be suitably used in a small cylindrical battery.

The electrolytic copper foil is obtained, for example, by immersing a metal-made drum in a nonaqueous electrolytic solution having dissolved therein copper ion, flowing a current while rotating the drum to deposit copper on the drum surface, and separating the copper. Copper may also be deposited on the rolled copper foil surface by electrolytic process. One surface or both surfaces of the copper foil may be subjected to a surface roughening treatment or a surface treatment (for example, a chromate treatment to a thickness of approximately from several nm to 1 µm or a primer treatment such as Ti).

(11) Thickness Ratio Between Current Collector and Active-Material Layer

The thickness ratio between the current collector and the active material layer is not particularly limited, but the value of "(thickness of the active material layer on one surface immediately before the injection of nonaqueous electrolytic solution)/(thickness of the current collector)" is preferably 150 or less, more preferably 20 or less, still more preferably 10 or less, and is preferably 0.1 or more, more preferably 0.4 or more, still more preferably 1 or more.

If the thickness ratio between the current collector and the negative electrode active material layer exceeds this range, the current collector sometimes shows exothermic behavior due to Joule heat during charging/discharging at high current density, whereas if the thickness ratio is less than the range above, the volume ratio of the current collector to the negative electrode active material increases and the battery capacity may decrease.

(12) Electrode Density

The electrode structure at the electrode formation of the negative electrode active material is not particularly limited, but the density of the active material present on the current collector is preferably 1 g·cm$^{-3}$ or more, more preferably 1.2 g·cm$^{-3}$ or more, still more preferably 1.3 g·cm$^{-3}$ or more, yet still more preferably 1.5 g·cm$^{-3}$, and is preferably 3 g·cm$^{-3}$ or less, more preferably 2.5 g·cm$^{-3}$ or less, still more preferably 2.2 g·cm$^{-3}$ or less, yet still more preferably 2 g·cm$^{-3}$ or less.

If the density of the active material present on the current collector exceeds this range, bonding between the current collector and the negative electrode active material becomes weak to cause dissociation of the active material from the electrode, whereas if the density is less than the range above, the electrical conductivity between negative electrode active materials may decrease and the battery resistance may increase.

(13) Binder

The binder for binding negative electrode active materials is not particularly limited as long as it is a material stable to the nonaqueous electrolytic solution and the solvent used at the production of the electrode.

Examples of the binder include a resin-based polymer such as polyethylene, polypropylene, polyethylene terephthalate, polymethyl methacrylate, polyimide, aromatic polyamide, cellulose and nitrocellulose; a rubbery polymer such as SBR (styrene-butadiene rubber), isoprene rubber, butadiene rubber, fluororubber, NBR (acrylonitrile-butadiene rubber) and ethylene-propylene rubber; a styrene-butadiene-styrene block copolymer and a hydrogenation product thereof; a thermoplastic elastomeric polymer such as EPDM (ethylene-propylene-diene terpolymer), styrene-ethylene-butadiene-styrene copolymer, styrene-isoprene-styrene block copolymer and hydrogenation product thereof; a soft resinous polymer such as syndiotactic-1,2-polybutadiene, polyvinyl acetate, ethylene-vinyl acetate copolymer and propylene-α-olefin copolymer; a fluoropolymer such as polyvinylidene fluoride, polytetrafluoroethylene, fluorinated polyvinylidene fluoride and polytetrafluoroethylene-ethylene copolymer; and an ion-conductive polymer composition of an alkali metal ion (particularly, lithium ion). One of these binders may be used alone, or two or more thereof may be used in any combination in an arbitrary ratio.

The solvent for forming a slurry is not particularly limited in its kind as long as it is a solvent capable of dissolving or dispersing the negative electrode active material and a binder as well as a thickener and an electrically conductive material which are used, if desired, and either an aqueous solvent or an organic solvent may be used.

Examples of the aqueous solvent include water and alcohol. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetamide, hexamethylphosphoramide, dimethyl sulfoxide, benzene, xylene, quinoline, pyridine, methylnaphthalene and hexane. Particularly, in the case of using an aqueous solvent, a dispersant or the like is added together with the thickener described above, and a slurry is formed using a latex such as SBR. One of these solvents may be used alone, or two or more thereof may be used in any combination in an arbitrary ratio.

The ratio of the binder to the negative electrode active material is preferably 0.1 mass % or more, more preferably 0.5 mass % or more, still more preferably 0.6 mass % or more, and is preferably 20 mass % or less, more preferably 15 mass % or less, still more preferably 10 mass % or less, yet still more preferably 8 mass % or less.

If the ratio of the binder to the negative electrode active material exceeds this range, the proportion of the binder that does not contribute to the battery capacity may increase in the binder amount to incur a decrease of the battery capacity, whereas if the ratio is less than the range above, reduction in the strength of the negative electrode is incurred and this is sometimes disadvantageous in view of the battery production step.

In particular, when a rubbery polymer typified by SBR is contained as a major component, the ratio of the binder to the active material is preferably 0.1 mass % or more, more preferably 0.5 mass % or more, still more preferably 0.6 mass % or more, and is preferably 5 mass % or less, more preferably 3 mass % or less, still more preferably 2 mass % or less.

In the case where a fluoropolymer typified by polyvinylidene fluoride is contained as a major component, the ratio to the active material is preferably 1 mass % or more, more preferably 2 mass % or more, still more preferably 3 mass % or more, and is preferably 15 mass % or less, more preferably 10 mass % or less, still more preferably 8 mass % or less.

A thickener is usually used for controlling the viscosity of the slurry. The thickener is not particularly limited, but examples thereof include carboxymethyl cellulose, methyl cellulose, hydroxymethyl cellulose, ethyl cellulose, polyvinyl alcohol, oxidized starch, phosphated starch, casein, and salts thereof. One of these thickeners may be used alone, or two or more thereof may be used in any combination in an arbitrary ratio.

In the case of using a thickener, the ratio of the thickener to the negative electrode active material is preferably 0.1 mass % or more, more preferably 0.5 mass % or more, still more preferably 0.6 mass % or more, and is preferably 5 mass % or less, more preferably 3 mass % or less, still more preferably 2 mass % or less.

If the ratio of the thickener to the negative electrode active material is less than this range, the coatability may be significantly impaired, whereas if the ratio exceeds the range above, the proportion of the active material occupying in the negative electrode active material layer decreases and this may cause a problem of reduction in the battery capacity or lead to an increase in the resistance between negative electrode active materials.

(14) Impedance

The resistance of the negative electrode when the battery is charged to 60% of the nominal capacity from discharged state is preferably 500Ω or less, more preferably 100Ω or less, still more preferably 50Ω or less. Also, the double-layer capacity of the negative electrode when the battery is charged to 60% of the nominal capacity from discharged state is preferably $1 \times 10^{-6}$ F or more, more preferably $1 \times 10^{-5}$ F or more, still more preferably $3 \times 10^{-5}$ F or more. This is because when a negative electrode within the ranges above is used, good output characteristics are advantageously obtained.

The nonaqueous electrolytic secondary battery used for measurement of the resistance and double-layer capacity of the negative electrode has a capacity of 80% or more of the nominal capacity after the battery is charged at a current value capable of charging the nominal capacity in 5 hours, kept in the state of being neither charged nor discharged for 20 minutes, and then discharged at a current value capable of discharging the nominal capacity in 1 hour.

(15) Area of Negative Electrode Plate

The area of the negative electrode plate is not particularly limited, but the negative electrode plate is preferably designed to be slightly larger than the opposite positive electrode plate so that the positive electrode plate is not allowed to protrude outward from the negative electrode plate. In view of cycle life after repeated charging and discharging or from the standpoint of suppressing the deterioration due to high-temperature storage, the area of the negative electrode is preferably as close to that of the positive electrode as possible, because the proportion of the electrode working more uniformly and effectively is increased and the characteristics are thereby enhanced. Particularly, in use at a large current, the design of the electrode area is important.

(16) Thickness of Negative Electrode Plate

The thickness of the negative electrode plate is designed in combination with the positive electrode plate used and is not particularly limited, but the thickness of the mix layer excluding the thickness of the core metal foil is preferably 15 μm or more, more preferably 20 μm or more, still more preferably 30 μm or more, and is preferably 150 μm or less, more preferably 120 μm or less, still more preferably 100 μm or less.

4. Positive Electrode 4-1. Positive Electrode Active Material

The positive electrode active material for use in the positive electrode is described below.

(1) Composition

The positive electrode active material is not particularly limited as long as it is a material capable of electrochemically occluding/releasing a lithium ion but, for example, a material containing lithium and at least one kind of a transition metal is preferred. Examples of the material include a lithium-transition metal composite oxide and a lithium-containing transition metal phosphate compound.

Preferred examples of the transition metal in the lithium-transition metal composite oxide include vanadium (V), titanium (Ti), chromium (Cr), manganese (Mn), iron (Fe), cobalt (Co), nickel (Ni) and copper (Cu).

Examples of the lithium transition metal composite oxide include lithium-cobalt composite oxides such as $LiCoO_2$, lithium-nickel composite oxides such as $LiNiO_2$, lithium-manganese composite oxides such as $LiMnO_2$, $LiMn_2O_4$, and $Li_2MnO_4$, and composite oxides where a part of the transition metal atom as a major ingredient of these lithium transition metal composite oxides is replaced by other metals such as aluminum (Al), titanium (Ti), vanadium (V), chromium (Cr), manganese (Mn), iron (Fe), cobalt (Co), lithium (Li), nickel (Ni), copper (Cu), zinc (Zn), magnesium (Mg), gallium (Ga), zirconium (Zr) and silicon (Si).

Examples of the lithium transition metal composite oxide with a part of the transition metal atom as a major ingredient being replaced with the metal above include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

Preferred examples of the transition metal of the lithium-containing transition metal phosphate compound include vanadium (V), titanium (Ti), chromium (Cr), manganese (Mn), iron (Fe), cobalt (Co), nickel (Ni) and copper (Cu). Examples of the lithium-containing transition metal phosphate compound include iron phosphates such as $LiFePO_4$, $Li_3Fe_2(PO_4)_3$ and $LiFeP_2O_7$, cobalt phosphates such as $LiCoPO_4$, manganese phosphates such as $LiMnPO_4$, and compounds where a part of the transition metal atom as a major ingredient of these lithium transition metal phosphate compounds is replaced by other metals such as aluminum (Al), titanium (Ti), vanadium (V), chromium (Cr), manganese (Mn), iron (Fe), cobalt (Co), lithium (Li), nickel (Ni), copper (Cu), zinc (Zn), magnesium (Mg), gallium (Ga), zirconium (Zr), niobium (Nb) and silicon (Si).

(2) Surface Coating

A material where a substance differing in the composition from the substance constituting the positive electrode active material as a major ingredient is attached to the surface of the positive electrode active material above (hereinafter, sometimes simply referred to as "surface adhesion substance") may also be used. Examples of the surface adhesion substance include oxides such as aluminum oxide, silicon oxide, titanium oxide, zirconium oxide, magnesium oxide, calcium oxide, boron oxide, antimony oxide and bismuth oxide; sulfates such as lithium sulfate, sodium sulfate, potassium sulfate, magnesium sulfate, calcium sulfate and aluminum sulfate; and carbonates such as lithium carbonate, calcium carbonate and magnesium carbonate.

The surface adhesion substance can be attached to the positive electrode active material surface, for example, by a method of dissolving or suspending the substance in a solvent, impregnating and adding the solution or suspension into the positive electrode active material, and drying the active material; a method of dissolving or suspending a precursor of the surface adhesion substance in a solvent, impregnating and adding the solution or suspension into the positive electrode active material, and causing a reaction by heating or the like; or a method of adding the substance to a precursor of the positive electrode active material and at the same time, baking the mixture.

The mass of the surface adhesion substance attached to the surface of the positive electrode active material is preferably 0.1 ppm or more, more preferably 1 ppm or more, still more preferably 10 ppm or more, and is preferably 20% or less, more preferably 10% or less, still more preferably 5% or less, based on the mass of the positive electrode active material.

Thanks to the surface adhesion substance, the oxidation reaction of the nonaqueous electrolytic solution on the positive electrode active material surface can be suppressed and in turn, the battery life can be increased. However, if the amount attached is less than the range above, the effect is not sufficiently brought out, whereas if it exceeds the range, the surface adhesion substance may inhibit moving-in or moving-out of lithium ion and the resistance may increase. For these reasons, the above-described range is preferred.

(3) Shape

The shape of the positive electrode active material particle is not particularly limited, and examples thereof include massive form, polyhedral form, spherical form, ellipsoidal form, plate form, needle form and columnar form. Above all, a particle which is a secondary particle formed by the aggregation of primary particles and in which the shape of the secondary particle is a spherical or ellipsoidal form, is preferred.

In an electrochemical device, the active material in the electrode usually undergoes expansion/contraction as the device is charged/discharged and due to the stress thereof, deterioration such as breakage of active material and breakage of conduction path is liable to occur. Therefore, an active material in which a secondary particle is formed resulting from aggregation of primary particles is preferred, because this active material can relieve the stress of expansion/contraction and prevent deterioration as compared with an active material composed of a single particle, that is, only primary particles.

Also, a spherical or ellipsoidal particle is better than an axial orientation particle such as plate-like particle, because the spherical or ellipsoidal particle causes little orientation at the electrode formation, reduces expansion/contraction of the electrode during charging/discharging and is liable to be uniformly mixed in the mixing with an electrically conductive material at the production of the electrode.

(4) Tap Density

The tap density of the positive electrode active material is preferably 1.3 g·cm$^{-3}$ or more, more preferably 1.5 g·cm$^{-3}$ or more, still more preferably 1.6 g·cm$^{-3}$ or more, yet still more preferably 1.7 g·cm$^{-3}$ or more, and is preferably 2.5 g·cm$^{-3}$ or less, more preferably 2.4 g·cm$^{-3}$ or less.

A high-density positive electrode active material layer can be formed by using a metal composite oxide powder having a high tap density. If the tap density of the positive electrode material is less than the range above, the amount of the dispersion medium required at the formation of the positive electrode active material layer is increased and at the same time, the required amounts of electrically conductive material and binder are also increased, as a result, the packing ratio of the positive electrode active material into the positive electrode active material layer and in turn, the battery capacity are sometimes restricted. In general, the tap density is preferably higher and has no particular upper limit, but at a tap density less than the range above, diffusion of lithium ion in the positive electrode active material layer using a nonaqueous electrolytic solution as the medium becomes rate-controlling, and the load characteristics are sometimes liable to decrease.

In the measurement of the tap density, a sample is passed through a sieve having an opening size of 300 μm and allowed to fall in a 20 cm$^3$ tapping cell and after the cell is filled with the sample, tapping with a stroke length of 10 mm is performed 1,000 times by using a powder density measuring instrument (for example, Tap Denser manufactured by Seishin Enterprise Co., Ltd.). From the volume here and the mass of the sample, the density is calculated. The tap density calculated by this measurement is defined as the tap density of the positive electrode active material in the present invention.

(5) Median Diameter d50

The median diameter d50 (the secondary particle diameter when a secondary particle is formed resulting from aggregation of primary particles) of the positive electrode active material particle can be measured also by using a laser diffraction/scattering particle size analyzer.

The median diameter d50 of the positive electrode active material is preferably 0.1 μm or more, more preferably 0.5 μm or more, still more preferably 1 μm or more, yet still more preferably 3 μm or more, and is preferably 20 μm or less, more preferably 18 μm or less, still more preferably 16 μm or less, yet still more preferably 15 μm or less.

If the median diameters d50 of the positive electrode active material is less than this range, a high bulk-density product may not be obtained, whereas if it exceeds the range above, diffusion of lithium in the particle takes much time and this may lead to deterioration of the battery characteristics or allow for occurrence of streaking or the like at the production of the positive electrode of the battery, that is, in the process of forming a slurry of the active material, an electrically conductive material, a binder and the like by using a solvent and coating the slurry in a thin film manner.

(6) Average Primary Particle Size

In the case where a secondary particle is formed resulting from aggregation of primary particles, the average primary particle diameter of the positive electrode active material is preferably 0.01 μm or more, more preferably 0.05 μm or more, still more preferably 0.08 μm or more, yet still more preferably 0.1 μm or more, and is preferably 3 μm or less, more preferably 2 μm or less, still more preferably 1 μm or less, yet still more preferably 0.6 μm or less.

If the average primary particle diameter exceeds this range, spherical secondary particles are difficult to form and this adversely affects the powder packing or leads to great reduction in the specific surface area, giving rise to a high possibility that the battery performance such as output characteristics decreases, whereas if it is less than the range above, crystals are usually not grown and therefore, the performance of the secondary battery may deteriorate, for example, poor charge/discharge reversibility may result.

(7) BET Specific Surface Area

The BET specific surface area of the positive electrode active material, in terms of the value of specific surface area as measured by the BET method, is preferably 0.2 m$^2$·g$^{-1}$ or more, more preferably 0.3 m$^2$·g$^{-1}$ or more, still more preferably 0.4 m$^2$·g$^{-1}$ or more, and is preferably 4.0 m$^2$·g$^{-1}$ or less, more preferably 2.5 m$^2$·g$^{-1}$ or less, still more preferably 1.5 m$^2$·g$^{-1}$ or less.

If the value of BET specific surface area is less than this range, the battery performance is liable to decrease, whereas if it exceeds the range above, the tap density is hardly increased and the coatability at the formation of the positive active electrode may deteriorate.

(8) Production Process of Positive Electrode Active Material

The production process of the positive electrode active material is not particularly limited, and a method generally used as the production process of an inorganic compound can be employed.

In particular, for producing a spherical or ellipsoidal active material, various methods may be considered. Specifically, for example, a transition metal source material such as transition metal nitrate or sulfate and if desired, source materials of other elements are dissolved or pulverized/dispersed in a solvent such as water, the pH is adjusted with stirring to prepare a spherical precursor, the precursor is recovered and, if desired, dried, a lithium source such as LiOH, Li$_2$CO$_3$ and LiNO$_3$ is added thereto, and the mixture is burned at a high temperature to obtain an active material.

Also, for example, a transition metal source material such as transition metal nitrate, sulfate, hydroxide or oxide and, if desired, source materials of other elements are dissolved or pulverized/dispersed in a solvent such as water, the solution or dispersion is dry-formed with a spray dryer or the like to obtain a spherical or ellipsoidal precursor, a lithium source such as LiOH, Li$_2$CO$_3$ and LiNO$_3$ is added to the precursor, and the mixture is burned at a high temperature to obtain an active material.

Furthermore, for example, a transition metal source material such as transition metal nitrate, sulfate, hydroxide or oxide, a lithium source such as LiOH, Li$_2$CO$_3$ and LiNO$_3$, and, if desired, source materials of other elements are dissolved or pulverized/dispersed in a solvent such as water, the solution or dispersion is dry-formed with a spray dryer or the like to obtain a spherical or ellipsoidal precursor, and the precursor is burned at a high temperature to obtain an active material.

4-2. Structure and Fabrication Method of Electrode

The configuration and fabrication method of the positive electrode for use in the present invention are described below.

(1) Fabrication Method of Positive Electrode

The positive electrode can be fabricated by forming a positive electrode active material layer containing a particulate positive electrode active material and a binder on a current collector and can be produced by a known method. For example, a positive electrode active material, a binder and, if desired, an electrically conductive material, a thickener and the like are dry-mixed and shaped into a sheet, and the sheet is attached under pressure on a positive electrode current collector, whereby a positive electrode can be obtained. Alternatively, for example, the materials are dissolved or dispersed in a liquid medium to form a slurry, and the slurry is coated on a positive electrode current collector and dried to form a positive electrode active material layer on the current collector, whereby a positive electrode can be obtained.

The content of the positive electrode active material in the positive electrode active material layer is preferably 10 mass % or more, more preferably 30 mass % or more, still more preferably 50 mass % or more, and is preferably 99.9 mass % or less, more preferably 99 mass % or less.

This is because if the content of the positive electrode active material is less than this range, insufficient electric capacity may result, whereas if the content exceeds the range above, the positive electrode may lack the strength. Incidentally, as for the positive electrode active material power for use in the present invention, one kind of a powder may be used alone, or two or more kinds of powders differing in the composition or differing in the powder properties may be used in any combination in an arbitrary ratio.

(2) Electrically Conductive Material

As for the electrically conductive material, a known electrically conductive material can be optionally used. Examples thereof include a metal material such as copper and nickel; and a carbonaceous material such as graphite (e.g., natural graphite, artificial graphite), carbon black (e.g., acetylene black) and amorphous carbon (e.g., needle coke). One of these electrically conductive materials may be used alone, or two or more thereof may be used in any combination in an arbitrary ratio.

The content of the electrically conductive material in the positive electrode active material layer is preferably 0.01 mass % or more, more preferably 0.1 mass % or more, still more preferably 1 mass % or more, and is preferably 50 mass % or less, more preferably 30 mass % or less, still more preferably 15 mass % or less. If the content is less than this range, insufficient electric conductivity may result, whereas if the content exceeds the range above, the battery capacity may decrease.

(3) Binder

The binder is not particularly limited as long as it is a material stable to the nonaqueous electrolytic solution and the solvent used at the production of the electrode.

In the case of a coating method, the binder is not particularly limited as long as it is a material capable of being dissolved or dispersed in the liquid medium used at the production of the electrode, and examples thereof include a resin-based polymer such as polyethylene, polypropylene, polyethylene terephthalate, polymethyl methacrylate, aromatic polyamide, cellulose and nitrocellulose; a rubbery polymer such as SBR (styrene-butadiene rubber), NBR (acrylonitrile-butadiene rubber), fluororubber, isoprene rubber, butadiene rubber and ethylene-propylene rubber; a styrene-butadiene-styrene block copolymer and a hydrogenation product thereof; a thermoplastic elastomeric polymer such as EPDM (ethylene-propylene-diene terpolymer), styrene-ethylene-butadiene-styrene copolymer, styrene-isoprene-styrene block copolymer and hydrogenation product thereof; a soft resinous polymer such as syndiotactic-1,2-polybutadiene, polyvinyl acetate, ethylene-vinyl acetate copolymer and propylene-α-olefin copolymer; a fluoropolymer such as polyvinylidene fluoride PVdF), polytetrafluoroethylene, fluorinated polyvinylidene fluoride and polytetrafluoroethylene-ethylene copolymer; and an ion-conductive polymer composition of an alkali metal ion (particularly, lithium ion). One of these substances may be used alone, or two or more thereof may be used in any combination in an arbitrary ratio.

The content of the binder in the positive electrode active material layer is preferably 0.1 mass % or more, more preferably 1 mass % or more, still more preferably 3 mass % or more, and is preferably 80 mass % or less, more preferably 60 mass % or less, still more preferably 40 mass % or less, yet still more preferably 10 mass % or less.

If the ratio of the binder is less than this range, the positive electrode active material cannot be sufficiently held, lacking in the mechanical strength of the positive electrode, and the battery performance such as cycle characteristics may be worsened, whereas if the ratio exceeds the range above, this may lead to reduction in the battery capacity or electrical conductivity.

(4) Liquid Medium

The liquid medium used for forming a slurry is not particularly limited as long as it is, for example, a solvent capable of dissolving or dispersing the positive electrode active material, an electrically conductive material, a binder and a thickener that is used, if desired, and either an aqueous solvent or an organic solvent may be used.

Examples of the aqueous solvent include water and a mixed solvent of an alcohol and water. Examples of the organic solvent include aliphatic hydrocarbons such as hexane; aromatic hydrocarbons such as benzene, toluene, xylene and methylnaphthalene; heterocyclic compounds such as quinoline and pyridine; ketones such as acetone, methyl ethyl ketone and cyclohexanone; esters such as methyl acetate and methyl acrylate; amines such as diethylenetriamine and N,N-dimethylaminopropylamine; ethers such as diethyl ether and tetrahydrofuran (THF); amides such as N-methylpyrrolidone (NMP), dimethylformamide and dimethylacetamide; and aprotic polar solvents such as hexamethylphosphoramide and dimethyl sulfoxide. One of these solvents may be used alone, or two or more thereof may be used in any combination in an arbitrary ratio.

(5) Thickener

In the case of using an aqueous medium as the liquid medium for forming a slurry, the slurrying is preferably performed using a thickener and a latex such as styrene-butadiene rubber (SBR). A thickener is usually used for adjusting the viscosity of the slurry.

The thickener is not particularly limited, and examples thereof include carboxymethyl cellulose, methyl cellulose, hydroxymethyl cellulose, ethyl cellulose, polyvinyl alcohol, oxidized starch, phosphated starch, casein, and salts thereof. One of these thickeners may be used alone, or two or more thereof may be used in any combination in an arbitrary ratio.

The ratio of the thickener to the positive electrode active material is preferably 0.1 mass % or more, more preferably 0.5 mass % or more, still more preferably 0.6 mass % or more, and is preferably 5 mass % or less, more preferably 3 mass % or less, still more preferably 2 mass % or less.

If the ratio of the thickener to the positive electrode active material is less than this range, the coatability may be significantly impaired, whereas if the ratio exceeds the range above, the proportion of the active material occupying in the positive electrode active material layer decreases and this may cause a problem of reduction in the battery capacity or lead to an increase in the resistance between positive electrode active materials.

(6) Compaction

The positive electrode active material layer obtained through coating and drying is preferably compacted with a hand press, roller press or the like so as to increase the packing density of the positive electrode active material. The density of the positive electrode active material layer is preferably 1 $g \cdot cm^{-3}$ or more, more preferably 1.5 $g \cdot cm^{-3}$ or more, still more preferably 2 $g \cdot cm^{-3}$ or more, and is preferably 4 $g \cdot cm^{-3}$ or less, more preferably 3.5 $g \cdot cm^{-3}$ or less, still more preferably 3 $g \cdot cm^{-3}$ or less.

If the density of the positive electrode active material layer exceeds this range, penetrability of the nonaqueous electrolytic solution to the vicinity of the current collector/active material interface decreases, and charge/discharge characteristics particularly at high current density deteriorate, whereas if the density is less than the range above, the electric conductivity between active materials decreases and the battery resistance may increase.

(7) Current Collector

The material of the positive electrode current collector is not particularly limited, and a known material can be arbitrarily used. Examples thereof include a metal material such as aluminum, stainless steel, nickel-plated material, titanium and tantalum; and a carbonaceous material such as carbon cloth and carbon paper. Among these, a metal material, particularly aluminum, is preferred.

In the case of a metal material, examples of the shape of the current collector include metal foil, metal cylinder, metal coil, metal plate, thin metal film, expanded metal, perforated metal and metal foam. In the case of a carbonaceous material, examples of the collector shape include carbon plate, thin carbon film and carbon cylinder. Among these, a thin metal film is preferred. The thin film may be appropriately formed like a mesh.

The thickness of the current collector may be arbitrarily set but is preferably 1 μm or more, more preferably 3 μm or more, still more preferably 5 μm or more, and is preferably 1 mm or less, more preferably 100 μm or less, still more preferably 50 μm or less. If the thickness of the thin film is less than this range, the strength required as a current collector may lack, whereas if the thickness of the thin film exceeds the range above, handleability is sometimes impaired.

The thickness ratio between the current collector and the positive electrode active material layer is not particularly limited, but the value of "(thickness of the active material layer on one surface immediately before the injection of nonaqueous electrolytic solution)/(thickness of the current collector)" is preferably 150 or less, more preferably 20 or less, still more preferably 10 or less, and is preferably 0.1 or more, more preferably 0.4 or more, still more preferably 1 or more.

If the thickness ratio between the current collector and the positive electrode active material layer exceeds this range, the current collector sometimes shows exothermic behavior due to Joule heat during charging/discharging at high current density, whereas if the thickness ratio is less than the range above, the volume ratio of the current collector to the positive electrode active material increases and the battery capacity may decrease.

(8) Electrode Area

From the standpoint of increasing the stability at high output and high temperature, the area of the positive electrode active material layer is preferably larger than the outer surface area of the battery outer case. Specifically, the area ratio of the total electrode area of the positive electrode to the surface area of the outer case for the secondary battery is preferably set to 20 times or more, more preferably 40 times or more.

The term "outer surface area of the outer case" indicates, in the case of a bottomed rectangular shape, a total area calculated from the length, width and thickness dimensions of the case in the portion packed with a power-generating element, excluding the terminal projection portions, and in the case of a bottomed cylindrical shape, indicates a geometric surface area determined by approximating a cylinder of the case in the portion packed with a power-generating element, excluding the terminal projection portions.

The term "total electrode area of the positive electrode" indicates a geometric surface area of the positive electrode mix layer facing the mix layer containing a negative electrode active material, and in a structure obtained by forming a positive electrode mix layer on both surfaces of a current collector foil, indicates the sum of areas separately calculated for respective surfaces.

(9) Discharge Capacity

In the case of using the nonaqueous electrolytic solution of the present invention, the electric capacity (the electric capacity when the battery in a fully charged state is discharged to a discharged state) of battery elements housed in one battery case of the secondary battery is preferably 3 ampere hour (Ah) or more, because the effect of improving the low-temperature discharge characteristics is increased.

Therefore, the positive electrode plate is designed such that the discharge capacity at full charge becomes preferably 3 Ah (ampere hour), more preferably 4 Ah or more, and preferably 20 Ah or less, more preferably 10 Ah or less.

If the discharge capacity is less than this limit, a great voltage drop occurs due to electrode reaction resistance when extracting a large current and the electrical power efficiency may be worsened, whereas if the discharge capacity exceeds the range above, the electrode reaction resistance decreases and the electrical power efficiency is improved, but a wide temperature distribution results due to heat generation inside the battery during pulse charging/discharging and the durability against repetition of charging/discharging is poor or also, the heat dissipation efficiency may deteriorate for abrupt heat generation in abnormal situations such as overcharge and internal short circuiting.

(10) Thickness of Positive Electrode Plate

The thickness of the positive electrode plate is not particularly limited, but in view of high capacity, high output and high rate characteristics, the thickness of the mix layer, excluding the thickness of the core metal foil, is preferably 10 μm or more, more preferably 20 μm or more, and is preferably 200 μm or less, more preferably 100 μm or less, per one surface of the current collector.

5. Separator

A separator is usually interposed between the positive electrode and the negative electrode so as to prevent short circuiting therebetween. In this case, the separator can be used by impregnating it with the nonaqueous electrolytic solution of the present invention.

The separator is not particularly limited in its material and shape, and a known material or shape can be arbitrarily employed as long as the effects of the present invention are not seriously impaired. Above all, a resin, a glass fiber, an inorganic material or the like formed of a material stable to the nonaqueous electrolytic solution of the present invention is used and, for example, a separator in the form of a porous sheet or a nonwoven fabric each having excellent liquid retentivity is preferably used.

Examples of the material which can be used for the resin and glass fiber separators include a polyolefin such as polyethylene and polypropylene, polytetrafluoroethylene, polyethersulfone, and a glass filter. Among these, a glass filter and a polyolefin are preferred, and a polyolefin is more preferred. One of these materials may be used alone, or two or more thereof may be used in any combination in an arbitrary ratio.

The thickness of the separator may be arbitrarily set but is preferably 1 μm or more, more preferably 5 μm or more, still more preferably 10 μm or more, and is preferably 50 μm or less, more preferably 40 μm or less, still more preferably 30 μm or less.

If the thickness of the separator is less than this range, the insulating property and the mechanical strength may decrease, whereas if the thickness exceed the range above, not only the battery performance such as rate characteristics may deteriorate but also the energy density as the entire nonaqueous electrolytic secondary battery is sometimes reduced.

In the case of using a porous separator such as porous sheet or nonwoven fabric, the porosity of the separator may be arbitrarily set but is preferably 20% or more, more preferably 35% or more, still more preferably 45% or more, and is preferably 90% or less, more preferably 85% or less, still more preferably 75% or less.

If the porosity is less than this range, the film resistance is increased and the rate characteristics are liable to deteriorate, whereas if the porosity exceeds the range above, the mechanical strength of the separator is reduced and the insulating property tends to decrease.

The average pore size of the separator may also be arbitrarily set but is preferably 0.5 µm or less, more preferably 0.2 µm or less, and is preferably 0.05 µm or more. If the average pore size of the separator exceeds this range, short circuiting readily occurs, whereas if the average pore size is less than the range above, the film resistance is increased and the rate characteristics are sometimes reduced.

Examples of the inorganic material used for the separator include oxides such as alumina and silicon dioxide, nitrides such as aluminum nitride and silicon nitride, sulfates such as barium sulfate and calcium sulfate. Also, a separator in the particle or fiber form is used.

As regards the morphology, for example, a separator having a thin film shape, such as nonwoven fabric, woven fabric and microporous film, can be used. A thin film having a pore size of 0.01 to 1 µm and a thickness of 5 to 50 µm is suitably used.

Other than this independent thin film shape, a separator obtained by forming a composite porous layer containing particles of the inorganic material above on the surface layer of at least one of the positive electrode and the negative electrode with use of a resin-made binder can be used. For example, a porous layer is formed on both surfaces of the positive electrode by using alumina particles with the 90% of the particle size being less than 1 µm and using a fluororesin as the binder.

6. Battery Design 6-1. Electrode Group

The electrode group is not particularly limited, and examples thereof include an electrode group having a multilayer structure in which the above-described positive electrode plate and negative electrode plate are laminated through the above-described separator, and an electrode group having a wound structure in which the above-described positive electrode plate and negative electrode plate are spirally wound through the above-described separator.

The proportion of the volume of the electrode group occupying in the internal volume of the battery (hereinafter sometimes simply referred to as "electrode group occupancy") is preferably 40% or more, more preferably 50% or more, and is preferably 90% or less, more preferably 80% or less.

If the electrode group occupancy is less than this range, the battery capacity decreases, whereas if it exceeds the range above, the void space is reduced and when the temperature of the battery rises, the internal pressure is increased due to expansion of members or increase in the vapor pressure of a liquid component of the electrolyte, as a result, various characteristics of the battery, such as charge/discharge cycle performance and high-temperature storability, may deteriorate and furthermore, a gas release valve for allowing the internal pressure to escape to the outside is sometimes actuated.

6-2. Current Collector Structure

The current collector structure is not particularly limited and in order to more effectively realize the improvement of discharge characteristics thanks to the nonaqueous electrolytic solution of the present invention, a structure allowing the resistance of wiring portion and joint portion to decrease is preferred. In the case where the internal resistance is reduced in this way, the effects by the use of the nonaqueous electrolytic solution of the present invention are successfully exerted, in particular.

In the case of an electrode group in the multilayer structure, a current collector structure formed by bundling the metal core portions of respective electrode layers and welding the bundle to a terminal is preferred. When the electrode area of one sheet is large, the internal resistance increases. Therefore, it is also preferred to provide a plurality of terminals in the electrode and thereby reduce the resistance. In the case of an electrode group in the wound structure, the internal resistance can be reduced by providing a plurality of lead structures for each of the positive electrode and the negative electrode and bundling them into a terminal.

The internal resistance can be reduced as low as possible by optimizing the structure above. In the case of a battery used with a large current, the impedance (hereinafter sometimes simply referred to as "direct current component") as measured by the 10 kHz alternating current method is preferably set to 10 mΩ (milliohm) or less, and it is more preferred to set the direct current component to 5 mΩ or less.

When the direct current component is set to 0.1 mΩ or less, the high output characteristics are improved, but the proportion of current collector structure materials used is increased and the battery capacity is sometimes decreased.

The nonaqueous electrolytic solution of the present invention has an effect on the decrease of reaction resistance relating to lithium elimination/insertion from/into the electrode active material, and this is a factor for enabling realization of good low-temperature discharge characteristics. However, in a battery whose direct current resistance is usually more than 10 mΩ, the effect of reducing the reaction resistance cannot be 100% reflected on the low-temperature discharge characteristics due to hindrance by the direct current resistance. This can be improved by using a battery having a small direct current resistance component and then, the effects of the nonaqueous electrolytic solution of the present invention can be satisfactorily brought out.

From the standpoint of bringing out the effects of the nonaqueous electrolytic solution and fabricating a battery enhanced in the low-temperature discharge characteristics, it is particularly preferred to simultaneously satisfy both this requirement and the above-mentioned requirement that the electric capacity (the electric capacity when the battery in a fully charged state is discharged to a discharged state) of battery elements housed in one battery case of the secondary battery is 3 ampere hour (Ah) or more.

6-3. Outer Case

The material for the outer case is not particularly limited, and examples thereof include metals such as nickel-plated steel plate, stainless steel, aluminum, aluminum alloy and magnesium alloy, and a laminated film (laminate film) of a resin and an aluminum foil. In view of reduction in the weight, a metal such as aluminum or aluminum alloy, and a laminate film are suitably used.

The outer case using the metals include those having a hermetically sealed structure formed by welding metals together by means of laser welding, resistance welding and ultrasonic welding, and those having a caulk structure formed by using the above-described metals via a resin-made gasket.

Examples of the outer case using the laminate film include those having a hermetically sealed structure formed by heat-sealing resin layers together. In order to enhance the sealing property, a resin different from the resin used for the laminate film may be interposed between the resin layers. Particularly, in the case of forming a hermetic structure by heat-sealing resin layers together through a current collector terminal, because of jointing between metal and resin, a resin having a polar group or a modified resin having introduced thereinto a polar group is suitably used as the resin interposed.

6-4. Protective Element

For example, a PTC (Positive Temperature Coefficient) capable of increasing the resistance upon occurrence of abnormal heat generation or excessive current flow, a temperature fuse, a thermister, and a valve (current shutoff valve) for blocking the current flowing in the circuit due to abrupt increase in the internal pressure or internal temperature of the battery upon occurrence of abnormal heat generation can be used as the protective element. As for the protective element, those satisfying the condition that the element does not work in normal use of high current are preferably selected. In view of high output, it is more preferred to design a battery free from abnormal heat generation or thermal runaway even without a protective element.

6-5. Housing Case

The nonaqueous electrolytic secondary battery of the present invention is usually fabricated by housing the above-described nonaqueous electrolytic solution, negative electrode, positive electrode, separator and the like in a housing case. The housing case is not particularly limited, and a known housing case can be arbitrarily employed.

The material of the housing case is not particularly limited, and examples thereof include nickel-plated iron, stainless steel, aluminum or an alloy thereof, nickel, and titanium.

The shape of the housing case is also not particularly limited, and examples thereof include a cylindrical form, a prismatic form, a laminate form, a coin form and a large form.

EXAMPLES

The present invention is described in greater detail below by referring to Examples, but the present invention should not be construed as being limited to these contents, and the materials, blending amounts and the like set forth in the following Examples are mere examples for explanation and can be appropriately changed or modified.

Example 1-1

Diphosphorus pentoxide (2.9 g) was weighed into a 250 ml-volume PFA vessel, and 3.4 g of lithium hexafluorophosphate (reagent, produced by Stella Chemifa Corporation) was added. Subsequently, 8.9 g of a dimethyl carbonate solution of 15% (concentration in mass %, hereinafter the same) hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. The obtained crystal of lithium difluorophosphate was subjected to anion analysis by ion chromatography (DX-500, manufactured by Dionex Corporation, column: AS-23), and the relative area ratio of difluorophosphate ion was taken as the purity of lithium difluorophosphate. The purity of the obtained crystal of lithium difluorophosphate was 95% in terms of the relative area.

Example 1-2

Lithium hexafluorophosphate (reagent, produced by Stella Chemifa Corporation) (7.0 g) was weighed into a 250 ml-volume PFA vessel, and 3.4 g of lithium carbonate (reagent, produced by Wako Pure Chemical Industries, Ltd.) was added. Furthermore, 6.5 g of diphosphorus pentoxide (reagent, produced by Wako Pure Chemical Industries, Ltd.) was added. Subsequently, 35 g of a dimethyl carbonate solution of 10% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 95% in terms of the relative area.

Example 1-3

Lithium hexafluorophosphate (reagent, produced by Stella Chemifa Corporation) (3.6 g) was weighed into a 250 ml-volume PFA vessel, and 2.4 g of lithium fluoride (reagent, produced by Stella Chemifa Corporation) was added. Furthermore, 6.6 g of diphosphorus pentoxide (reagent, produced by Wako Pure Chemical Industries, Ltd.) was added. Subsequently, 25.0 g of a dimethyl carbonate solution of 5% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 94% in terms of the relative area.

Example 1-4

Lithium hexafluorophosphate (reagent, produced by Stella Chemifa Corporation) (36 g) was weighed into a 1 L-volume PFA vessel, and 11.8 g of lithium fluoride (reagent, produced by Stella Chemifa Corporation) and 66.7 g of diphosphorus pentoxide (reagent, produced by Wako Pure Chemical Industries, Ltd.) were added. Subsequently, 300 g of anhydrous hydrofluoric acid was added, and the mixture was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 89% in terms of the relative area.

Example 1-5

Phosphoric trichloride (reagent, produced by Wako Pure Chemical Industries, Ltd.) (25.0 g), 6.2 g of lithium hexafluorophosphate (reagent, produced by Stella Chemifa Corporation) and 3.4 g of lithium hydroxide monohydrate (reagent, produced by Wako Pure Chemical Industries, Ltd.) were weighed into a 250 ml-volume PFA vessel. Subsequently, 50.0 g of a dimethyl carbonate solution of 10% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 93% in terms of the relative area.

Example 1-6

Diphosphoryl chloride (reagent, produced by Wako Pure Chemical Industries, Ltd.) (7.8 g), 4.9 g of lithium hexafluorophosphate (reagent, produced by Stella Chemifa Corporation) and 2.2 g of lithium carbonate (reagent, produced by Wako Pure Chemical Industries, Ltd.) were weighed into a 250 ml-volume PFA vessel. Subsequently, 48.0 g of a dimethyl carbonate solution of 10% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 93% in terms of the relative area.

Example 1-7

Pyrophosphoric acid (reagent, produced by Wako Pure Chemical Industries, Ltd.) (5.5 g) was weighed into a 250 ml-volume PFA vessel, and 9.5 g of lithium hexafluorophosphate (reagent, produced by Stella Chemifa Corporation) was added. Subsequently, 50.0 g of a dimethyl carbonate solution of 5% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 94% in terms of the relative area.

Example 1-8

Diphosphorus pentoxide (reagent, produced by Wako Pure Chemical Industries, Ltd.) (11.4 g), 6.2 g of lithium hexafluorophosphate (reagent, produced by Stella Chemifa Corporation) and 0.7 g of lithium tetraborate (reagent, produced by Wako Pure Chemical Industries, Ltd.) were weighed into a 250 ml-volume PFA vessel. Subsequently, 42.3 g of a dimethyl carbonate solution of 5% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 94% in terms of the relative area.

Example 1-9

Diphosphorus pentoxide (reagent, produced by Wako Pure Chemical Industries, Ltd.) (8.7 g), 4.7 g of lithium hexafluorophosphate (reagent, produced by Stella Chemifa Corporation) and 0.5 g of lithium dihydrogenphosphate (reagent, produced by Wako Pure Chemical Industries, Ltd.) were weighed into a 250 ml-volume PFA vessel. Subsequently, 32.5 g of a dimethyl carbonate solution of 5% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 95% in terms of the relative area.

Example 1-10

Diphosphorus pentoxide (reagent, produced by Wako Pure Chemical Industries, Ltd.) (9.5 g), 5.1 g of lithium hexafluorophosphate (reagent, produced by Stella Chemifa Corporation) and 0.2 g of lithium oxide (reagent, produced by Wako Pure Chemical Industries, Ltd.) were weighed into a 250 ml-volume PFA vessel. Subsequently, 36.1 g of a dimethyl carbonate solution of 5% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 95% in terms of the relative area.

Example 1-11)

Diphosphorus pentoxide (reagent, produced by Wako Pure Chemical Industries, Ltd.) (13.5 g), 7.3 g of lithium hexafluorophosphate (reagent, produced by Stella Chemifa Corporation) and 0.2 g of lithium hydroxide monohydrate (reagent, produced by Wako Pure Chemical Industries, Ltd.) were weighed into a 250 ml-volume PFA vessel. Subsequently, 51.0 g of a dimethyl carbonate solution of 5% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of lithium difluorophosphate. Anion analysis was performed in the same manner as in Example 1-1, as a result, the purity of the obtained crystal of lithium difluorophosphate was 93% in terms of the relative area.

Example 1-12

Diphosphorus pentoxide (2.8 g) was weighed into a 250 ml-volume PFA vessel, and 3.7 g of sodium hexafluorophosphate (reagent, produced by Stella Chemifa Corporation) was added. Subsequently, 13.4 g of a dimethyl carbonate solution of 10% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of sodium difluorophosphate. Anion analysis was performed in the same manner as in Example 1-1, as a result, the purity of the obtained crystal of sodium difluorophosphate was 94% in terms of the relative area.

Example 1-13

Diphosphorus pentoxide (reagent, produced by Wako Pure Chemical Industries, Ltd.) (6.5 g), 8.5 g of potassium hexafluorophosphate (reagent, produced by Stella Chemifa Corporation) and 6.4 g of potassium carbonate (reagent, produced by Wako Pure Chemical Industries, Ltd.) were weighed into a 250 ml-volume PFA vessel. Subsequently, 36.0 g of a dimethyl carbonate solution of 10% hydrogen fluoride was added, and the mixture was refluxed at 110° C. for 1 hour while flowing nitrogen. Insoluble matters in the reaction solution were separated by filtration, and the residue was heated at 130° C. for 17 hours, thereby distilling off the excess solvent and reaction by-products, and then cooled to room temperature to obtain a crystal of potassium difluorophosphate. Anion analysis was performed in the same manner as in Example 1-1, as a result, the purity of the obtained crystal of potassium difluorophosphate was 93% in terms of the relative area.

Example 1-14

Diphosphorus pentoxide (reagent, produced by Wako Pure Chemical Industries, Ltd.) (2.8 g) was weighed into a 250 ml-volume PFA vessel, and 5.7 g of 1-butyl-3-methylimidazolium hexafluorophosphate (reagent, produced by Wako Pure Chemical Industries, Ltd.) was added. Subsequently, 14.0 g of a dimethyl carbonate solution of 10% hydrogen fluoride was added, and the mixture was refluxed at 110° C. for 1 hour while flowing nitrogen. Thereafter, the reaction solution was heated at 130° C. for 17 hours, thereby distilling off the excess solvent and reaction by-products, and then cooled to room temperature to obtain 1-butyl-3-methylimidazolium difluorophosphate. Anion analysis was performed in the same manner as in Example 1-1, as a result, the purity of the obtained 1-butyl-3-methylimidazolium difluorophosphate was 92% in terms of the relative area.

Comparative Example 1-1

The production process was performed in the same manner as in Example 1-3 except for not using lithium hexafluorophosphate. Anion analysis was performed in the same manner as in Example 1-1, as a result, the purity of the obtained crystal of lithium difluorophosphate was 53.4% in terms of the relative area.

From comparison of the results of Examples 1-1 to 1-14 with the results of Comparative Example 1-1, it is seen that according to the production process (the first production process) of the present invention, a high-purity difluorophosphate can be obtained.

Example 2-1

Difluorophosphoric acid (reagent, produced by Fluorochem Ltd.) (15.4 g) was weighed into a 250 ml-volume PFA vessel, and 3.4 g of lithium hexafluorophosphate (reagent, produced by Stella Chemifa Corporation) was added. Furthermore, 6.4 g of lithium chloride (reagent, produced by Wako Pure Chemical Industries, Ltd.) was added, and the mixture was stirred for 1 hour under nitrogen flow and after heating at 130° C. for 17 hours, cooled to room temperature to obtain a crystal of lithium difluorophosphate. Anion analysis was performed in the same manner as in Example 1-1, as a result, the purity of the obtained crystal of lithium difluorophosphate was 92% in terms of the relative area.

Example 2-2

Difluorophosphoric acid (reagent, produced by Fluorochem Ltd.) (15.4 g) was weighed into a 250 ml-volume PFA vessel, and 3.4 g of lithium hexafluorophosphate (reagent, produced by Stella Chemifa Corporation) was added. Furthermore, 6.4 g of lithium chloride (reagent, produced by Wako Pure Chemical Industries, Ltd.) and 15.0 g of dimethyl carbonate were added, and the mixture was stirred for 1 hour under nitrogen flow and after heating at 130° C. for 17 hours, cooled to room temperature to obtain a crystal of lithium difluorophosphate. Anion analysis was performed in the same manner as in Example 1-1, as a result, the purity of the obtained crystal of lithium difluorophosphate was 92% in terms of the relative area.

Example 2-3

Difluorophosphoric acid (reagent, produced by Fluorochem Ltd.) (22.4 g) was weighed into a 250 ml-volume PFA vessel, and 5.5 g of sodium hexafluorophosphate (reagent, produced by Stella Chemifa Corporation) was added. Furthermore, 12.8 g of sodium chloride (reagent, produced by Wako Pure Chemical Industries, Ltd.) was added, and the mixture was stirred for 1 hour under nitrogen flow and after heating at 130° C. for 17 hours, cooled to room temperature to obtain a crystal of sodium difluorophosphate. Anion analysis was performed in the same manner as in Example 1-1, as a result, the purity of the obtained crystal of sodium difluorophosphate was 91% in terms of the relative area.

Example 2-4

Difluorophosphoric acid (reagent, produced by Fluorochem Ltd.) (17.0 g) was weighed into a 250 ml-volume PFA vessel, and 4.5 g of potassium hexafluorophosphate (reagent, produced by Stella Chemifa Corporation) was added. Furthermore, 12.3 g of potassium chloride (reagent, produced by Wako Pure Chemical Industries, Ltd.) and 17.0 g of dimethyl carbonate were added, and the mixture was stirred for 1 hour under nitrogen flow and after heating at 130° C. for 17 hours, cooled to room temperature to obtain a crystal of potassium difluorophosphate. Anion analysis was performed in the same manner as in Example 1-1, as a result, the purity of the obtained crystal of potassium difluorophosphate was 90% in terms of the relative area.

Example 2-5

Difluorophosphoric acid (reagent, produced by Fluorochem Ltd.) (20.0 g) was weighed into a 250 ml-volume PFA vessel, and 4.4 g of lithium hexafluorophosphate (reagent, produced by Stella Chemifa Corporation) was added. Furthermore, 5.0 g of lithium fluoride (reagent, produced by Wako Pure Chemical Industries, Ltd.) was added, and the mixture was stirred for 1 hour under nitrogen flow and after heating at 130° C. for 17 hours, cooled to room temperature to obtain a crystal of lithium difluorophosphate. Anion analysis was performed in the same manner as in Example 1-1, as a result, the purity of the obtained crystal of lithium difluorophosphate was 90% in terms of the relative area.

Example 2-6

Difluorophosphoric acid (reagent, produced by Fluorochem Ltd.) (18.3 g) was weighed into a 250 ml-volume PFA vessel, and 4.0 g of lithium hexafluorophosphate (reagent, produced by Stella Chemifa Corporation) was added. Furthermore, 10.4 g of sodium chloride (reagent, produced by Wako Pure Chemical Industries, Ltd.) was added, and the mixture was stirred for 1 hour under nitrogen flow and after heating at 130° C. for 17 hours, cooled to room temperature to obtain a mixed crystal of sodium difluorophosphate and lithium difluorophosphate. Anion analysis was performed in the same manner as in Example 2-6, as a result, the obtained difluorophosphate ion was 93% in terms of the relative area.

Example 2-7

Difluorophosphoric acid (reagent, produced by Fluorochem Ltd.) (18.6 g) was weighed into a 250 ml-volume PFA vessel, and 4.1 g of lithium hexafluorophosphate (reagent, produced by Stella Chemifa Corporation) was added. Furthermore, 13.5 g of potassium chloride (reagent, produced by Wako Pure Chemical Industries, Ltd.) and 20.0 g of dimethyl carbonate were added, and the mixture was stirred for 1 hour under nitrogen flow and after heating at 130° C. for 17 hours, cooled to room temperature to obtain a mixed crystal of potassium difluorophosphate and lithium difluorophosphate. Anion analysis was performed in the same manner as in Example 2-6, as a result, the obtained difluorophosphate ion was 91% in terms of the relative area.

Example 2-8

Difluorophosphoric acid (reagent, produced by Fluorochem Ltd.) (15.4 g) was weighed into a 250 ml-volume PFA vessel, and 3.4 g of lithium hexafluorophosphate (reagent, produced by Stella Chemifa Corporation) was added. Furthermore, 7.1 g of magnesium chloride (reagent, produced by Wako Pure Chemical Industries, Ltd.) and 15.0 g of dimethyl carbonate (reagent, produced by Kishida Chemical Co., Ltd.) were added, and the mixture was stirred for 1 hour under nitrogen flow and after heating at 130° C. for 17 hours, cooled to room temperature to obtain a mixed crystal of magnesium difluorophosphate and lithium difluorophosphate. Anion analysis was performed in the same manner as in Example 2-6, as a result, the obtained difluorophosphate ion was 91% in terms of the relative area.

Comparative Example 2-1

The production process was performed in the same manner as in Example 2-1 except for not using lithium hexafluorophosphate. The purity of the obtained crystal of lithium difluorophosphate was 60% in terms of the relative area.

Comparative Example 2-2

The production process was performed in the same manner as in Example 2-2 except for not using lithium hexafluorophosphate. The purity of the obtained crystal of lithium difluorophosphate was 62% in terms of the relative area.

Comparative Example 2-3

The production process was performed in the same manner as in Example 2-3 except for not using sodium hexafluorophosphate. The purity of the obtained crystal of sodium difluorophosphate was 55% in terms of the relative area.

Comparative Example 2-4

The production process was performed in the same manner as in Example 2-4 except for not using potassium hexafluorophosphate. The purity of the obtained crystal of potassium difluorophosphate was 45% in terms of the relative area.

Comparative Example 2-5

The production process was performed in the same manner as in Example 2-5 except for not using lithium hexafluorophosphate. The purity of the obtained crystal of lithium difluorophosphate was 48% in terms of the relative area.

Comparative Example 2-6

The production process was performed in the same manner as in Example 2-6 except for not using lithium hexafluorophosphate. The difluorophosphate ion of the obtained crystal was 49% in terms of the relative area.

Comparative Example 2-7

The production process was performed in the same manner as in Example 2-7 except for not using lithium hexafluorophosphate. The difluorophosphate ion of the obtained crystal was 46% in terms of the relative area.

Comparative Example 2-8

The production process was performed in the same manner as in Example 2-8 except for not using lithium hexafluorophosphate. The difluorophosphate ion of the obtained crystal was 40% in terms of the relative area.

From comparison of the results of Examples 2-1 to 2-8 with the results of Comparative Examples 2-1 to 2-8, it is seen that according to the production process (the second production process) of the present invention, a high-purity difluorophosphate can be obtained.

<Production of Secondary Battery>

In the following Examples and Comparative Examples, a secondary battery was fabricated, and evaluation of the battery was performed.

[Production of Positive Electrode]

Parts by mass of lithium nickel-manganese cobaltate ($LiNi_{0.33}CO_{0.33}Mn_{0.33}O_2$) was used as the positive electrode active material and mixed with 6 parts by mass of carbon black and 9 parts by mass of polyvinylidene fluoride ("KF-1000", trade name, produced by Kureha Chemical Industry Co., Ltd.), and N-methyl-2-pyrrolidone was added thereto to form a slurry. This slurry was uniformly coated on both surfaces a 15 µm-thick aluminum foil, then dried and further pressed to give a positive electrode active material layer density of 3.0 g·cm$^{-3}$. In this way, the positive electrode was produced.

[Production of Negative Electrode]

100 Parts by mass of an aqueous dispersion of sodium carboxymethyl cellulose (concentration of sodium carboxymethyl cellulose: 1 mass %) as a thickener and 2 parts by mass of an aqueous dispersion of styrene-butadiene rubber (concentration of styrene-butadiene rubber: 50 mass %) as a binder were added to 98 parts by mass of artificial graphite powder ("KS-44", trade name, produced by Timcal), and these were mixed by means of a disperser to form a slurry. The obtained slurry was uniformly coated on one surface of a 12 μm-thick copper foil, then dried and further pressed to give a negative electrode active material layer density of 1.5 g·cm$^{-3}$. In this way, a negative electrode was produced.

[Fabrication of Nonaqueous Electrolytic Secondary Battery]

The positive electrode and negative electrode produced above and a polyethylene-made separator were stacked in order of negative electrode, separator, positive electrode, separator and negative electrode. The thus-obtained battery element was wrapped in a cylindrical aluminum laminate film and after injecting each electrolytic solution of Examples and Comparative Examples, the case was vacuum-sealed to produce a sheet-form nonaqueous electrolytic secondary battery. Furthermore, the sheet battery was sandwiched between glass plates and pressed so as to enhance contact between the electrodes.

[Nonaqueous Electrolytic Solution]

Example 3-1

A crystal of lithium difluorophosphate was obtained in the same manner as in Example 2-1, and the obtained lithium difluorophosphate was thoroughly dried. In a dry argon atmosphere, 1 mol/L of thoroughly dried LiPF$_6$ and 1 mass % of lithium difluorophosphate obtained above were dissolved in a mixture of ethylene carbonate, dimethyl carbonate and ethyl methyl carbonate (volume ratio: 1:1:1) to prepare a nonaqueous electrolytic solution.

[Evaluation of Battery]
(Cycle Retention Rate)
Initial Charge/Discharge:

In a constant-temperature bath at 25° C., the sheet-form nonaqueous electrolytic secondary battery was charged to 4.2 V at 0.2 C constant current and constant voltage and then discharged to 3.0 V at 0.2 C. This cycle was repeated five times to stabilize the battery. The discharge capacity at the fifth cycle was defined as the initial capacity. Incidentally, 1 C indicates a current value at which the whole capacity of a battery is discharged in 1 hour.

Cycle Test:

The battery after initial charge/discharge was charged to 4.2 V at 60° C. by a 1 C constant current-constant voltage process and then discharged to 3.0 V at 1 C constant current, and this charge/discharge cycle was repeated 500 times. The ratio of the discharge capacity at the 500th cycle to the discharge capacity at the first cycle was defined as the cycle retention rate.

(Initial Low-Temperature Discharge Rate)
Low-Temperature Test:

The battery after initial charge/discharge was charged to 4.2 V at 25° C. by a 0.2 C constant current-constant voltage process and then subjected to 0.2 C constant current discharge at −30° C. The discharge capacity here was defined as the initial low-temperature capacity, and the ratio of the initial low-temperature capacity to the initial capacity was defined as the initial low-temperature discharge rate.

(Low-Temperature Discharge Rate after Cycle)

The battery after the cycle test was charged to 4.2 V at 25° C. by a 0.2 C constant current-constant voltage process and then discharged to 3.0 V at 0.2 C constant current. This cycle was repeated three times, and the discharge capacity at the third cycle was defined as the post-cycle capacity. Thereafter, the same battery was charged to 4.2 V at 25° C. by a 0.2 C constant current-constant voltage process and then subjected to 0.2 C constant current discharge at −30° C. The discharge capacity here was defined as the low-temperature discharge after cycle, and the ratio of the low-temperature discharge after cycle to the post-cycle capacity was defined as the low-temperature discharge rate after cycle. The results are shown in Table 1.

Example 3-2

A crystal of lithium difluorophosphate was obtained in the same manner as in Example 1-1, and the obtained lithium difluorophosphate was thoroughly dried. Evaluation of the battery was performed in the same manner as in Example 3-1. The results are shown in Table 1.

Example 3-3

A crystal of lithium difluorophosphate was obtained in the same manner as in Example 1-2, and the obtained lithium difluorophosphate was thoroughly dried. Evaluation of the battery was performed in the same manner as in Example 3-1. The results are shown in Table 1.

Example 3-4

A crystal of lithium difluorophosphate was obtained in the same manner as in Example 1-3, and the obtained lithium difluorophosphate was thoroughly dried. Evaluation of the battery was performed in the same manner as in Example 3-1. The results are shown in Table 1.

Example 3-5

A crystal of lithium difluorophosphate was obtained in the same manner as in Example 1-4, and the obtained lithium difluorophosphate was thoroughly dried. Evaluation of the battery was performed in the same manner as in Example 3-1. The results are shown in Table 1.

Comparative Example 3-1

Evaluation of the battery was performed in the same manner as in Example 3-1 except for not adding lithium difluorophosphate to the nonaqueous electrolytic solution. The results are shown in Table 1.

Comparative Example 3-2

Evaluation of the battery was performed in the same manner as in Example 3-1 except for preparing a nonaqueous electrolytic solution by using lithium difluorophosphate produced without using lithium hexafluorophosphate in Example 2-1. The results are shown in Table 1.

Comparative Example 3-3

Evaluation of the battery was performed in the same manner as in Example 3-1 except for preparing a nonaqueous electrolytic solution by using lithium difluorophosphate produced without using lithium hexafluorophosphate in Example 1-3. The results are shown in Table 1.

Comparative Example 3-4

Lithium difluorophosphate was prepared by referring to Example of JP-A-2008-140767. A SUS316L-made closed vessel having a nominal volume of 100 mL was used as a reaction apparatus by attaching a valve, a thermometer, a manometer and a safety valve to its lid. This reaction apparatus was thoroughly dried and then placed in a chamber filled with argon gas, and 15.2 g of lithium hexafluorophosphate salt (reagent, produced by Stella Chemifa Corporation), 30 mL of dimethyl carbonate (reagent, produced by Kishida Chemical Co., Ltd.) and 35.7 g of hexamethyldisiloxane (reagent, produced by Wako Pure Chemical Industries, Ltd.) were added to the reaction bath and dissolved. The reaction apparatus was sealed with the lid in a state of a stirring bar for magnetic stirrer being placed therein and then taken out from the chamber. Subsequently, the reaction was allowed to proceed at 60° C. for 6 hours while stirring with the magnetic stirrer. After the completion of reaction, the precipitated solid was separated by filtration under reduced pressure using a membrane filter, then washed with dimethyl carbonate and dried under reduced pressure at 50° C. and 1,000 Pa or less. Using the obtained lithium difluorophosphate, evaluation of the battery was performed in the same manner as in Example 3-1. The results are shown in Table 1.

TABLE 1

| | Initial Low-Temperature Discharge Rate (%) | Cycle Retention Rate (%) | Low-Temperature Discharge Rate After Cycle (%) |
|---|---|---|---|
| Example 3-1 | 65 | 70 | 64 |
| Example 3-2 | 69 | 74 | 67 |
| Example 3-3 | 69 | 74 | 66 |
| Example 3-4 | 68 | 73 | 65 |
| Example 3-5 | 64 | 69 | 62 |
| Comparative Example 3-1 | 45 | 59 | 43 |
| Comparative Example 3-2 | 54 | 63 | 52 |
| Comparative Example 3-3 | 53 | 62 | 50 |
| Comparative Example 3-4 | 61 | 66 | 60 |

Example 3-6

A battery was fabricated and evaluated in the same manner as in Example 3-1 except for using lithium cobaltate as the positive electrode active material in place of lithium nickel-manganese cobaltate. The results are shown in Table 2.

Comparative Example 3-5

A battery was fabricated and evaluated in the same manner as in Example 3-6 except for not adding lithium difluorophosphate to the nonaqueous electrolytic solution. The results are shown in Table 2.

Comparative Example 3-6

A battery was fabricated and evaluated in the same manner as in Example 3-6 except for using the nonaqueous electrolytic solution prepared in Comparative Example 3-2. The results are shown in Table 2.

TABLE 2

| | Initial Low-Temperature Discharge Rate (%) | Cycle Retention Rate (%) | Low-Temperature Discharge Rate After Cycle (%) |
|---|---|---|---|
| Example 3-6 | 62 | 68 | 61 |
| Comparative Example 3-5 | 42 | 56 | 41 |
| Comparative Example 3-6 | 48 | 59 | 47 |

The results in Table 1 reveal the followings.

First, when Examples 3-1 to 3-5 using a nonaqueous electrolytic solution containing lithium difluorophosphate obtained by the production process of the present invention are compared with Comparative Example 3-1 using a nonaqueous electrolytic solution not containing lithium difluorophosphate, in Examples 3-1 to 3-5, the initial low-temperature discharge rate, cycle retention rate and low-temperature discharge rate after cycle are by far higher than in Comparative Example 3-1.

In Comparative Examples 3-2 and 3-3 using a nonaqueous electrolytic solution containing lithium difluorophosphate prepared without using the production process of the present invention, various characteristics are improved as compared with Comparative Example 3-1 but are inferior to Examples 3-1 to 3-5.

Comparison with Comparative Example 3-4 using lithium difluorophosphate produced by a conventional method also reveals that the battery characteristics are more improved when a nonaqueous electrolytic solution using lithium difluorophosphate obtained by the production process of the present invention is used.

Furthermore, as seen from the results in Table 2, even when lithium cobaltate is used as the positive electrode active material in place of lithium nickel-manganese cobaltate, the same improvements of battery characteristics are obtained.

From these facts, it is understood that the nonaqueous electrolytic secondary battery using the nonaqueous electrolytic solution of the present invention is excellent in the low-temperature discharge characteristics and cycle characteristics.

While the invention has been described in detail and with reference to specific embodiments thereof, it will be apparent to one skilled in the art that various changes and modifications can be made therein without departing from the spirit and scope of the invention.

This application is based on three Japanese Patent Applications (Patent Application Nos. 2008-307202, 2008-307207 and 2008-307208) filed on Dec. 2, 2008, the entirety of which is incorporated herein by way of reference.

INDUSTRIAL APPLICABILITY

The nonaqueous electrolytic solution and nonaqueous electrolytic secondary battery of the present invention are not particularly limited in their usage and can be used in various known applications. Specific examples thereof include a notebook computer, a pen-input computer, a mobile computer, an electronic book player, a cellular phone, a portable facsimile, a portable copier, a portable printer, a headphone stereo, a video movie, a liquid crystal TV, a handy cleaner, a portable CD, a mini disk, a transceiver, an electronic notebook, an electric calculator, a memory card, a portable tape recorder, a radio, a backup power source, a motor, a car, a motorcycle, a motorized bicycle, a bicycle, a lighting fixture, a toy, a game machine, a clock, an electric tool, a strobe and a camera.

The invention claimed is:

1. A process for producing a difluorophosphate, comprising:
reacting at least one halide selected from the group consisting of an alkali metal halide, an alkaline earth metal halide, an aluminum halide and an onium halide with difluorophosphoric acid in the presence of a hexafluorophosphate at a reaction temperature of from 100° C. to 200° C.

2. The production process of a difluorophosphate as claimed in claim 1, wherein in said reacting, the halide is an alkali metal halide.

3. The production process of a difluorophosphate as claimed in claim 2, wherein in said reacting, the alkali metal halide is at least either one of lithium fluoride and lithium chloride.

4. The production process of a difluorophosphate as claimed in claim 1, wherein the hexafluorophosphate is at least one member selected from lithium hexafluorophosphate, sodium hexafluorophosphate, potassium hexafluorophosphate and ammonium hexafluorophosphate.

* * * * *